(12) United States Patent
Murakami et al.

(10) Patent No.: US 10,211,745 B2
(45) Date of Patent: Feb. 19, 2019

(54) RESONANT LLC CONVERTER WITH A MULTI-LEG TRANSFORMER WITH GAPPED CENTER LEG

(71) Applicant: Mitsubishi Electric Corporation, Tokyo (JP)

(72) Inventors: Satoshi Murakami, Tokyo (JP); Masaki Yamada, Tokyo (JP); Ryota Kondo, Tokyo (JP); Takaaki Takahara, Tokyo (JP); Yuta Komatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/761,656

(22) PCT Filed: Oct. 11, 2016

(86) PCT No.: PCT/JP2016/080109
§ 371 (c)(1),
(2) Date: Mar. 20, 2018

(87) PCT Pub. No.: WO2017/081971
PCT Pub. Date: May 18, 2017

(65) Prior Publication Data
US 2018/0350513 A1 Dec. 6, 2018

(30) Foreign Application Priority Data

Nov. 11, 2015 (JP) .................. 2015-220861

(51) Int. Cl.
*H02M 3/335* (2006.01)
*H01F 38/42* (2006.01)

(52) U.S. Cl.
CPC ... *H02M 3/33569* (2013.01); *H01F 2038/426* (2013.01); *Y02B 70/1425* (2013.01)

(58) Field of Classification Search
CPC ...... H02M 3/335–3/42; Y02B 50/1425; H01F 2007/085; H01F 2038/426
See application file for complete search history.

(56) References Cited

U.S. PATENT DOCUMENTS

2004/0179378 A1 9/2004 Tamura
2005/0057181 A1* 3/2005 Izumi ................ H05B 41/2881
315/209 R (Continued)

FOREIGN PATENT DOCUMENTS

JP 2003-304681 A 10/2003
JP 4151014 B2 9/2008

(Continued)

OTHER PUBLICATIONS

Y. Zhang, D. Xu, K. Mino and K. Sasagawa, "1MHz-1kW LLC Resonant Converter with Integrated Magnetics," APEC 07—Twenty-Second Annual IEEE Applied Power Electronics Conference and Exposition, Anaheim, CA, USA, 2007, pp. 955-961.*

(Continued)

*Primary Examiner* — Kyle J Moody
*Assistant Examiner* — Peter Novak
(74) *Attorney, Agent, or Firm* — Oblon, McClelland, Maier & Neustadt, L.L.P.

(57) ABSTRACT

A first winding, a second winding, a fourth winding, and a fifth winding functioning as a transformer are wound around respective side legs of a three-leg core. Third windings functioning as a DC reactor are wound around a center leg. Winding directions of the first winding, the second winding, and the third windings are set so that magnetic fluxes generated by DC currents flowing through the respective windings merge in the same direction at the center leg, and winding directions of the fourth winding and the fifth winding are set so that magnetic fluxes generated by AC currents flowing through the respective windings cancel (Continued)

each other at the center leg. Thus, the transformer and the DC reactor are integrated using the three-leg core, whereby size reduction and loss reduction of the integrated magnetic component are achieved.

15 Claims, 13 Drawing Sheets

(56) References Cited

U.S. PATENT DOCUMENTS

| | | | |
|---|---|---|---|
| 2009/0180305 A1 | 7/2009 | Hashino et al. | |
| 2010/0320994 A1 | 12/2010 | Hashino et al. | |
| 2015/0085533 A1* | 3/2015 | Tanahashi | H02M 1/10 363/17 |
| 2016/0301320 A1* | 10/2016 | Wakabayashi | H02M 3/33569 |

FOREIGN PATENT DOCUMENTS

| | | |
|---|---|---|
| JP | 2011-205806 A | 10/2011 |
| JP | 2012-134266 A | 7/2012 |
| JP | 5144284 B2 | 2/2013 |

OTHER PUBLICATIONS

Japanese Office Action dated Apr. 4, 2017 in Corresponding Japanese Patent Application 2017-513566 (With English Translation), 6 pages.

International Search Report dated Jan. 17, 2017 in PCT/JP2016/080109 filed Oct. 11, 2016.

\* cited by examiner

RESONANT LLC CONVERTER WITH A MULTI-LEG TRANSFORMER WITH GAPPED CENTER LEG

TECHNICAL FIELD

The present invention relates to a power conversion device and the like that perform power conversion between AC voltage and DC voltage or between DC voltage and DC voltage, and to a magnetic component assembly used in such a device, and in particular, relates to technology for achieving size reduction and loss reduction of the device by integrating a plurality of magnetic components including a core and a winding.

BACKGROUND ART

Regarding such magnetic components of a power conversion device, for example, Patent Document 1 discloses that a plurality of reactors are provided to a magnetic circuit correspondingly for a plurality of choppers, and ripple components of magnetic fluxes generated by the plurality of reactors are generated in such directions as to cancel each other when passing through a gap of the magnetic circuit.

In addition, for example, Patent Document 2 discloses that a transformer is provided in which at least three windings connected in parallel are wound around a core, these at least three windings connected in parallel are wound around magnetic leg portions of a core so that any combination of the magnetic flux directions of magnetic fluxes generated in the respective windings become such directions as to cancel each other, and all of magnetic resistances in at least the smallest closed magnetic path among at least three closed magnetic paths are set to be equal.

Further, for example, Patent Document 3 discloses a DC/DC converter having a step-up circuit and a half bridge integrated with each other, in which an input choke coil, primary and secondary coils of an isolation transformer, and an output choke coil are wound around the same core, and DC magnetic fluxes generated by windings of these coils are set in such directions as to cancel each other.

CITATION LIST

Patent Document

Patent Document 1: Japanese Laid-Open Patent Publication No. 2003-304681 (see claim 1, paragraphs [0017] to [0019] of the specification, etc.)
Patent Document 2: Japanese Patent No. 5144284 (see claim 1, paragraph [0007] of the specification, etc.)
Patent Document 3: Japanese Patent No. 4151014 (see claim 1, paragraph [0006] of the specification, etc.)

SUMMARY OF THE INVENTION

Problems to be Solved by the Invention

In the DC voltage conversion device disclosed in the above Patent Document 1, ripple components of magnetic fluxes generated in the plurality of reactors are generated in such directions as to cancel each other when passing through the gap of the magnetic circuit, thereby reducing generated noise.

However, in Patent Document 1, the plurality of reactors form a coupled reactor which is substantially a single magnetic component to operate for a plurality of step-up circuits, and thus a concept of integrating different types of magnetic components is not described.

In the power conversion circuit disclosed in Patent Document 2, at least three windings connected in parallel are wound around magnetic leg portions of a core so that any combination of the magnetic flux directions of magnetic fluxes generated in the respective windings become such directions as to cancel each other, and all of magnetic resistances in at least the smallest closed magnetic path among at least three closed magnetic paths are set to be equal. Thus, size reduction of the transformer and iron loss reduction thereof are achieved.

However, in Patent Document 2, the transformer having the plurality of parallel windings form a coupled reactor which is substantially a single magnetic component to operate for a plurality of step-up circuits, and Patent Document 2 does not describe integration with a DC reactor which is indicated by L1 in the document and which is a magnetic component of a different type from the coupled reactor.

In the isolation-type switching DC/DC converter disclosed in Patent Document 3, the input choke coil, the primary and secondary coils of the isolation transformer, and the output choke coil are wound around the same core, and DC magnetic fluxes generated by windings of these coils are set in such directions as to cancel each other. Thus, reduction in the core volume of a magnetic component and reduction in core loss are achieved.

However, in Patent Document 3, although DC magnetic fluxes from the windings wound around the same leg of the core are cancelled, leakage of an AC magnetic flux at the gap is not cancelled, thus causing a problem such as occurrence of loss due to the leakage.

The present invention has been made to solve the above conventional problems, and an object of the present invention is to obtain a magnetic component assembly and a power conversion device using the magnetic component assembly, in which assembled magnetic components are reasonably integrated, thereby achieving size reduction and loss reduction.

Solution to the Problems

A magnetic component assembly according to the present invention includes: a winding coupled body formed of n number of windings magnetically coupled with each other, n being an integer equal to or greater than 2, one end of each winding being connected in series to a DC voltage source via a DC reactor, other ends of the windings being connected to nonlinear elements which become conductive at timings different from each other; and a multi-leg core formed of n number of side legs and a center leg having a gap portion, wherein the n number of windings of the winding coupled body are wound around the respective side legs of the multi-leg core, a winding of the DC reactor is wound around the center leg of the multi-leg core, and winding directions of the windings of the winding coupled body and the winding of the DC reactor are set so that magnetic fluxes generated by DC currents flowing through the windings of the winding coupled body and the winding of the DC reactor merge in the same direction at the center leg of the multi-leg core, whereby the DC reactor and the winding coupled body are integrated using the multi-leg core.

A first power conversion device using a magnetic component assembly according to the present invention converts AC voltage of AC terminals to DC voltage and outputs the DC voltage to DC terminals of the DC voltage source. The power conversion device includes: a transformer having a primary-side winding connected to the AC terminals and a secondary-side winding which is the winding coupled body and which is connected to the DC terminals, via rectification elements as the nonlinear elements, and the DC reactor. The secondary-side winding of the transformer is composed of a first winding and a second winding having respective ends connected in series to each ocher at an intermediate point, and other ends connected to the intermediate point via the rectification elements, the DC reactor, and the DC terminals. The DC reactor is composed of a third winding. The primary-side winding of the transformer is composed of a fourth winding and a fifth winding having respective ends connected in series to each other and other ends connected to the AC terminals. The power conversion device includes a three-leg core in which the number n for the multi-leg core is 2 so that the three-leg core is formed of two side legs and a center leg having a gap portion, the first winding and the second winding being wound around the respective side legs, the third winding being wound around the center leg, the fourth winding and the fifth winding being wound around the respective side legs. Winding directions of the first winding, the second winding, and the third winding are set so that magnetic fluxes generated by DC currents flowing through the first winding, the second winding, and the third winding merge in the same direction at the center leg, and winding directions of the fourth winding and the fifth winding are set so that magnetic fluxes generated by AC currents flowing through the fourth winding and the fifth winding cancel each other at the center leg, whereby the transformer and the DC reactor are integrated using the three-leg core.

A second power conversion device using a magnetic component assembly according to the present invention steps up DC voltage of the DC voltage source and outputs the stepped-up voltage to DC terminals. The power conversion device includes: the DC reactor including a DC winding having one end connected to the DC voltage source; a coupled reactor which is the winding coupled body and which includes coupled windings composed of the n number of windings, respective ends of the coupled windings being connected to another end of the DC reactor; a switching circuit having n number of upper arms and n number of lower arms which have switching elements as the nonlinear elements and are respectively connected in parallel between both poles of the DC terminals, intermediate connection points between the upper arms and the lower arms being respectively connected to other ends of the coupled windings; and the multi-leg core with the coupled windings respectively wound around the side legs, and with the DC winding wound around the center leg. Winding directions of the DC winding and the coupled windings are set so that magnetic fluxes generated by DC currents flowing through the DC winding and the coupled windings merge in the same direction at the center leg, whereby the coupled reactor and the DC reactor are integrated using the multi-leg core.

Effect of the Invention

In the magnetic component assembly according to the present invention, as described above, the winding directions of the windings are set so that magnetic fluxes generated by DC currents flowing through the windings of the winding coupled body and the winding of the DC reactor merge in the same direction at the center leg of the multi-leg core. Therefore, not only the number of turns of the winding forming the DC reactor, but also the number of turns of the winding coupled body which is originally a different type of magnetic component having a different function from that of the DC reactor, can contribute to the inductance of the DC reactor, whereby size reduction is achieved.

In the first power conversion device according to the present invention, as described above, the winding directions of the first winding, the second winding, and the third winding are set so that magnetic fluxes generated by DC currents flowing through the respective windings merge in the same direction at the center leg. Therefore, not only the number of turns of the third winding forming the DC reactor, but also the numbers of turns of the first and second windings of the transformer which is originally a different type of magnetic component having a different function from that of the DC reactor, can contribute to the inductance of the DC reactor, whereby size reduction is achieved.

Further, the winding directions of the fourth winding and the fifth winding are set so that magnetic fluxes generated by AC currents flowing through the respective windings cancel each other at the center leg. Therefore, a leakage magnetic flux does not occur from the gap portion in the center leg, and eddy current loss does not occur in the third winding wound around the center leg, whereby loss reduction is achieved.

In the second power conversion device according to the present invention, as described above, the winding directions of the DC winding and the coupled windings are set so that magnetic fluxes generated by DC currents flowing through the respective windings merge in the same direction at the center leg. Therefore, not only the number of turns of the DC winding forming the DC reactor, but also the numbers of turns of the coupled windings of the coupled reactor which is originally a different type of magnetic component having a different function from that of the DC reactor, can contribute to the inductance of the DC reactor, whereby size reduction is achieved. Further, an AC leakage magnetic flux does not occur in the gap portion of the center leg, and eddy current loss does not occur in the third winding wound around the center leg, whereby loss reduction is achieved.

DESCRIPTION OF EMBODIMENTS

Embodiment 1

Figure 1:
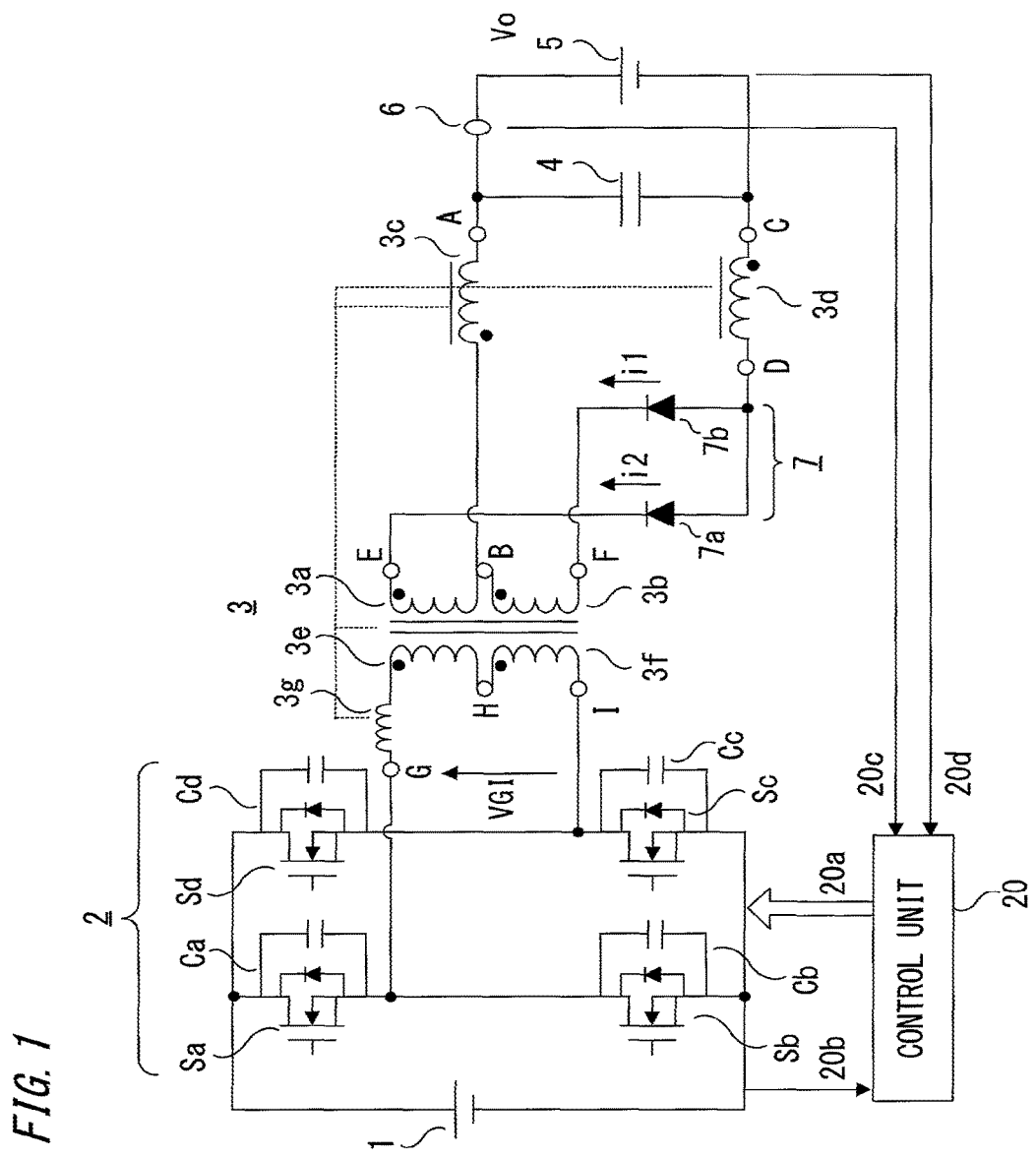
FIG. 1 is a diagram showing the entire configuration of a power conversion device according to embodiment 1 of the present invention.

FIG. 1 is a diagram showing the entire configuration of a power conversion device according to embodiment 1 of the present invention. The power conversion device in FIG. 1 includes, as a whole: a switching circuit 2 of which the DC input side is connected to a DC voltage source 1; an integrated magnetic component 3 of which the AC input side is connected to the AC output side of the switching circuit 2 and which is formed by integrating a transformer and a DC reactor which have been conventionally treated as different types of magnetic components; a rectification circuit 7 connected between the DC output side of the integrated magnetic component 3 and a DC voltage source (or load) 5; a filter capacitor 4; and a control unit 20 for controlling the switching circuit 2.

Hereinafter, the details of the above components will be described.

The switching circuit 2 is configured in a bridge form in which arms having switching elements Sa, Sb, Sc, Sd are connected in parallel two by two on the upper and lower sides, and converts DC voltage of the DC voltage source 1 to AC voltage and outputs the AC voltage to AC terminals G, I of the integrated magnetic component 3. Resonance capacitors Ca, Cb, Cc, Cd for achieving switching at zero voltage which is so-called soft switching as described later are connected between both poles, i.e., drains and sources, of the respective switching elements Sa, Sb, Sc, Sd.

The integrated magnetic component 3 includes: a first winding 3a and a second winding 3b which form a secondary-side winding of a part functioning as a transformer in the integrated magnetic component 3; a fourth winding 3e and a fifth winding 3f which form a primary-side winding thereof; and third windings 3c, 3d functioning as a DC reactor of the integrated magnetic component 3.

The first winding 3a and the second winding 3b have respective ends connected in series to each other at an intermediate point B, and the intermediate point B is connected to a positive pole A of DC terminals via the third winding 3c functioning as the DC reactor. Another end E of the first winding 3a is connected to a negative pole C of the DC terminals via a rectification element 7a composing the rectification circuit 7 and the third winding 3d functioning the DC reactor. Another end F of the second winding 3b is connected to the negative pole C of the DC terminals via a rectification element 7b composing the rectification circuit 7 and the third winding 3d functioning as the DC reactor.

The control unit 20 generates a drive signal 20a for driving the switching circuit 2, on the basis of voltage information 20b from the DC voltage source 1, current information 20c from a current sensor 6, and voltage information 20d from the DC voltage source 5 which is DC output voltage, thereby performing ON/OFF control of the switching elements Sa, Sb, Sc, Sd so as to achieve target output voltage.

It is noted that, in FIG. 1, the third winding is divided into two windings of 3c and 3d, and one winding 3c is provided on the positive pole A side of the DC terminals and the other winding 3d is provided on the negative pole C side of the DC terminals. This is for enabling such noise filter designing as to separate noise propagation mode into so-called differential mode (DM) and common mode (CM), by matching impedances of forward and return paths of a current route. If such a configuration is not requested, the third winding may be formed of one winding.

Figure 2A:
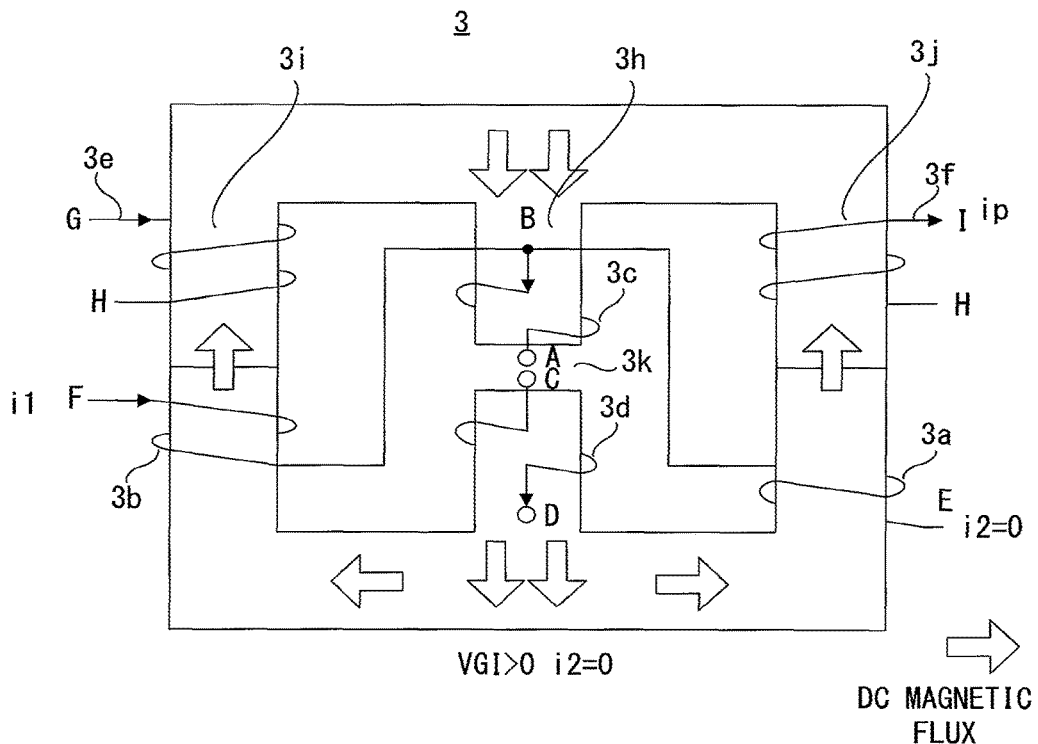
FIG. 2 is a diagram showing flow of a DC magnetic flux and a magnetomotive force (MMF) in an integrated magnetic component 3 shown in FIG. 1.
Figure 2B:
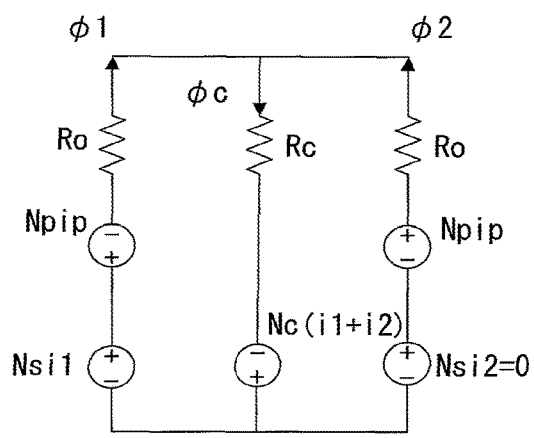

Next, the detailed configuration of the integrated magnetic component 3 and the operation thereof will be described with reference to FIG. 2. FIG. 2 is a diagram showing flow of a DC magnetic flux (FIG. 2A) and a magnetomotive force (MMF) (FIG. 2B) in the integrated magnetic component 3 shown in FIG. 1.

In FIG. 2A, the core is a three-leg core formed of two side legs, i.e., a first side leg 3i and a second side leg 3j, and a center leg 3h having a gap portion 3k, and is generally formed by, as shown in FIG. 2A, combining so-called EE-type cores symmetric between upper and lower sides or so-called EI-type cores asymmetric between upper and lower sides. It is noted that, at the center leg 3h, the gap portion 3k is provided for preventing DC magnetic flux saturation.

It is noted that a DC magnetic flux flowing through the center leg 3h is twice as great as DC magnetic fluxes flowing through the side legs 3i, 3j. Therefore, if the sectional area of the center leg 3h is designed to be twice as great as the sectional areas of the side legs 3i, 3j, a phenomenon of core saturation due to DC superimposition can be prevented.

Reference characters in FIG. 2 denote the following things.

Np: number of turns of fourth winding 3e, fifth winding 3f

Ns: number of turns of first winding 3a, second winding 3b

Nc: sum of numbers of turns of third windings 3c, 3d ip: current flowing through fourth winding 3e, fifth winding 3f i1: current flowing through second winding 3b i2: current flowing through first winding 3a Ro: magnetic resistance of first side leg 3i, second side leg 3j Rc: magnetic resistance of center leg 3h $\varphi 1$: magnetic flux flowing through first side leg 3i $\varphi 2$: magnetic flux flowing through second side leg 3j $\varphi c$: magnetic flux flowing through center leg 3h As shown in FIG. 2A, the first winding 3a is wound around the second side leg 3j, the second winding 3b is wound around the first side leg 3i, the third windings 3c, 3d are wound around the center leg 3h, the fourth winding 3e is wound around the first side leg 3i, and the fifth winding 3f is wound around the second side leg 3j.

The winding directions of the first winding 3a, the second winding 3b, and the third windings 3c, 3d are set so that magnetic fluxes (indicated by arrows in the drawing) generated by DC currents flowing through these windings merge in the same direction (downward in the drawing) at the center leg 3h.

The winding directions of the fourth winding 3e and the fifth winding 3f are set so that magnetic fluxes generated by AC currents flowing through these windings cancel each other at the center leg 3h.

In FIG. 2A, the first winding 3a and the second winding 3b are wound around the second side leg 3j and the first side leg 3i, respectively. However, as long as the above winding-direction condition is satisfied, conversely, the first winding 3a and the second winding 3b may be wound around the first side leg 3i and the second side leg 3j, respectively. Similarly, the fourth winding 3e and the fifth winding 3f are wound around the first side leg 3i and the second side leg 3j, respectively, but conversely, the fourth winding 3e and the fifth winding 3f may be wound around the second side leg 3j and the first side leg 3i, respectively.

FIG. 2B shows a magnetomotive force in a magnetic circuit formed by the integrated magnetic component 3. For example, a magnetomotive force (ampere-turn) when current i1 flows through the second winding 3b wound around the first side leg 3i is represented as Nsi1.

In FIG. 1 and FIG. 2, the first winding 3a and the second winding 3b forming the secondary-side winding of the transformer correspond to a winding coupled body described in claim 1 of the present application, and the third windings 3c, 3d correspond to a DC reactor described therein. Similarly, the rectification elements 7a, 7b forming the rectification circuit 7 correspond to a nonlinear element described therein. Further, the three-leg core formed of the two side legs 3i, 3j and the center leg 3h having the gap portion 3k shown in FIG. 2 correspond to a multi-leg core described therein.

Here, input voltage to the integrated magnetic component 3 is denoted by VGI and output voltage is denoted by Vo, and as an example, with the arrow direction in FIG. 1 assumed to be positive, the operation state of the integrated magnetic component 3 in the case of VGI >0 (therefore, i2 0) will be described using mathematical expressions.

First, it will be described that, in the present application, integrating the DC reactor and the transformer which are originally different types of magnetic components allows the number of turns of the transformer to contribute to formation of inductance of the DC reactor.

In the magnetic circuit in FIG. 2B from a relationship in which the magnetic potentials (i.e., current×number of turns (magnetomotive force)−magnetic flux×magnetic resistance) of the three legs are equal to each other, and a relationship of φ1+φ2=φc, the following expressions (1) to (3) are derived.

[Mathematical 1]

$$\phi 1 = \frac{i1}{2Rc + Ro} \cdot \left[ Ns \cdot \left(1 + \frac{Rc}{Ro}\right) + Nc \right] - \frac{Npip}{Ro} \quad (1)$$

$$\phi 2 = \frac{i1}{2Rc + Ro} \cdot \left[ -Ns \cdot \frac{Rc}{Ro} + Nc \right] + \frac{Npip}{Ro} \quad (2)$$

$$\phi c = \phi 1 + \phi 2 = \frac{2Nc + Ns}{2Rc + Ro} \cdot i1 \quad (3)$$

Regarding a voltage relationship, the following expressions (4), (5) are satisfied.

[Mathematical 2]

$$Np \frac{d\phi 2}{dt} - Np \frac{d\phi 1}{dt} = VGI \quad (4)$$

$$Ns \frac{d\phi 1}{dt} + Nc \frac{d\phi c}{dt} = -Vo \quad (5)$$

If expressions (1), (2) are substituted into expressions (4), (5) and then, for the purpose of calculating an inductance, the resultant expressions are arranged for change of current per unit time, expressions (6), (7) are obtained.

[Mathematical 3]

$$\frac{di1}{dt} = \frac{NsVGI - 2NpVo}{Np(2Nc + Ns)^2} \cdot (2Rc + Ro) \quad (6)$$

$$\frac{dip}{dt} = \frac{2Nc^2 Ro + 2NcNsRo + Ns^2(Rc + Ro)}{Np(2Nc + Ns)^2} \cdot VGI - \frac{Ns(2Rc + Ro)}{(2Nc + Ns)^2} \cdot Vo \quad (7)$$

Expression (6) is deformed into expression (8). Then, if a total inductance of the third windings 3c, 3d is denoted by L, from a relationship of L×di/dt=V, the inductance of the third windings 3c, 3d, i.e., the inductance L of the DC reactor is represented by expression (9).

[Mathematical 4]

$$\frac{(2Nc + Ns)^2}{2Rc + Ro} \times \frac{di1}{dt} = \frac{Ns}{Np} \cdot VGI - 2Vo \quad (8)$$

$$L = \frac{(2Nc + Ns)^2}{2Rc + Ro} \quad (9)$$

That is, the value functioning as the inductance L of the DC reactor changes and increases depending on not only the numbers of turns Nc of the third windings 3c, 3d but also the numbers of turns Ns of the first winding 3a and the second winding 3b originally composing the transformer. Therefore, for example, in the case where the same inductance value is required, the numbers of turns of the third windings 3c, 3d can be decreased, and accordingly, size reduction is achieved.

Next, it will be described that, in the present application, integrating the DC reactor and the transformer which are originally different types of magnetic components enables leakage inductance of the transformer to be adjusted by the number of turns of the DC reactor.

First, a sum Lm of inductances of the fourth winding 3e and the fifth winding 3f, which is an excitation inductance of the transformer, will be calculated.

Current ip flows through the fourth winding 3e and the fifth winding 3f. If expression (7) is deformed to be represented using, for convenience sake, a symbol Lm' represented by the following expression (10) and L in expression (9), expression (11) is obtained.

[Mathematical 5]

$$Lm' = \frac{2Np^2}{Ro} \quad (10)$$

$$\frac{dip}{dt} = \left[ \frac{1}{Lm'} + \frac{1}{2L} \cdot \left(\frac{Ns}{Np}\right)^2 \right] \cdot VGI - \frac{Ns}{Np} \cdot \frac{Vo}{L} \quad (11)$$

Also here, similarly, from the relationship of L×di/dt=V, on the basis of expression (11), the excitation inductance Lm is represented by the following expression (12).

[Mathematical 6]

$$\frac{1}{Lm} = \frac{1}{Lm'} + \left(\frac{Ns}{Np}\right)^2 \times \frac{1}{2L} \quad (12)$$

If expression (12) is rearranged using expression (8) and expression (9), the excitation inductance Lm is represented by the following expression (13).

[Mathematical 7]

$$Lm = \frac{2Np^2(2Nc + Ns)^2}{Ns^2(2Rc + Ro) + Ro(2Nc + Ns)^2} \quad (13)$$

If a leakage inductance of the transformer is denoted by Lr and the coupling coefficient of the transformer is denoted by k, the leakage inductance Lr of the transformer is represented by the following expression (14), using the excitation inductance Lm and the coupling coefficient k.

[Mathematical 8]

$$Lr = (1-k) \times Lm \quad (14)$$

Here, the coupling coefficient k is a constant value because the winding structure and the core shape are not changed. The excitation inductance Lm of the transformer can be adjusted by the number of turns of the DC reactor. That is, the excitation inductance Lm can be changed by the numbers of turns Nc of the third windings 3c, 3d.

In addition, as is found from expression (13) and expression (14), the leakage inductance Lr of the transformer can also be adjusted by the magnetic resistance Ro of the center leg 3h which originally determines the characteristics of the DC reactor, i.e., by the length of the gap portion 3k.

The transformer-primary-side equivalent value of the leakage inductance Lr of expression (14) is shown as a leakage inductance 3g in FIG. 1. The value of the leakage inductance Lr is adjusted so as to satisfy a resonance state with the capacitors Ca, Cb, Cc, Cd connected between both poles, i.e., drains and sources, of the respective switching elements Sa, Sb, Sc, Sd, whereby switching at zero voltage, i.e., so-called soft switching, is achieved, and thus switching loss can be greatly reduced.

Next, it will be described that AC magnetic fluxes are cancelled in the gap portion 3k provided at the center leg 3h of the core.

Figure 3A:
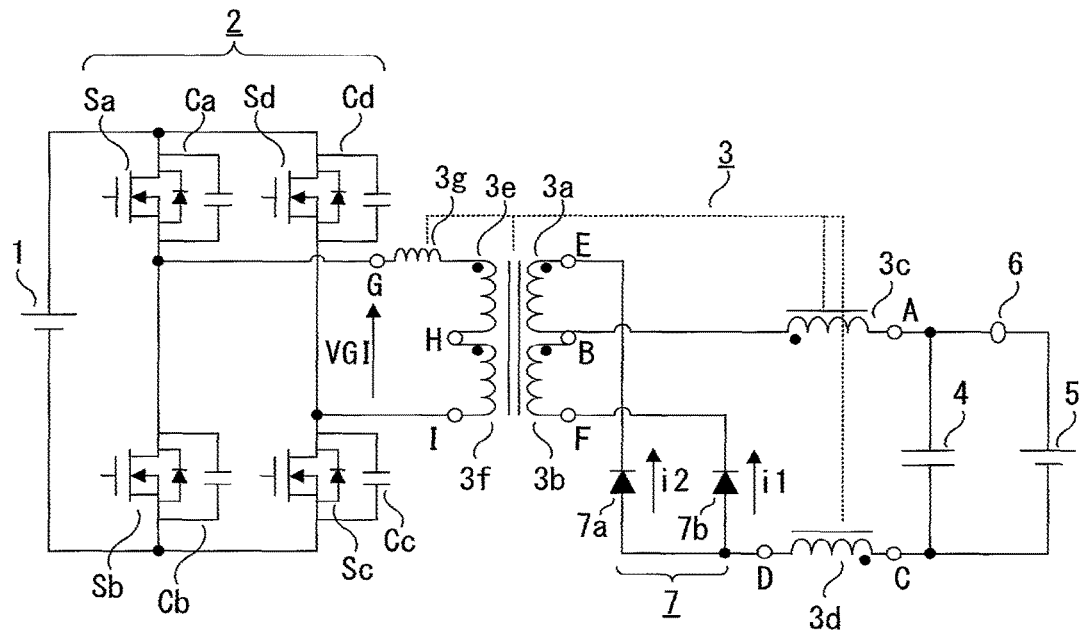
FIG. 3 is a diagram showing flow of an AC magnetic flux in the integrated magnetic component 3 shown in FIG. 1.
Figure 3B:
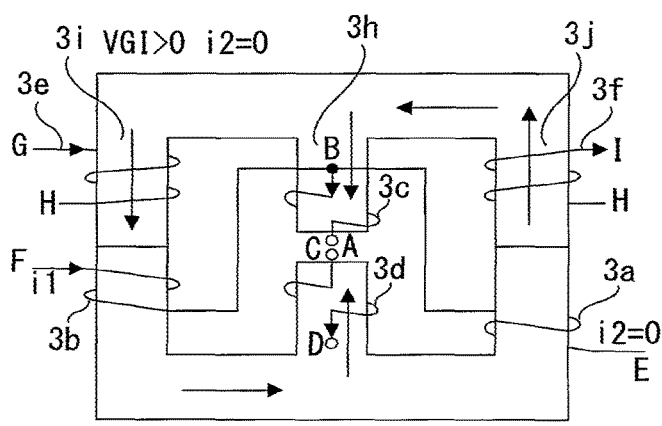

FIG. 3 shows flow of magnetic fluxes due to AC-component (ripple) currents flowing through the fourth winding 3e and the fifth winding 3f FIG. 3B shows the case where input voltage VGI >0 and i2=0 are satisfied, and therefore current i1 flows through the second winding 3b and along with this, current ip flows through the fourth winding 3e and the fifth winding 3f in the direction shown in the drawing.

Figure 3C:
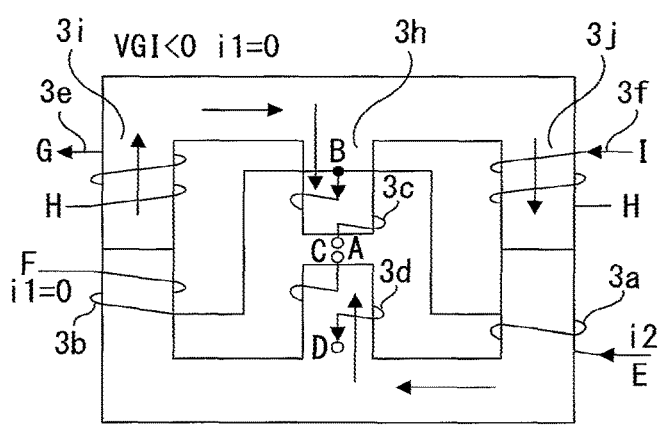

FIG. 3C shows the case where input voltage VGI <0 and i1=0 are satisfied and therefore current i2 flows through the first winding 3a and along with this, current ip flows through the fourth winding 3e and the fifth winding 3f in the direction shown in the drawing.

As descried above, the winding directions of the fourth winding 3e and the fifth winding 3f are set so that magnetic fluxes generated by AC currents flowing through these windings cancel each other at the center leg 3h. Therefore, as shown in FIG. 3, at the center leg 3h, the AC magnetic fluxes are in such directions as to cancel each other and thus are cancelled. Therefore, there is no leakage of AC magnetic flux from the gap portion 3k, and even if windings are provided around the center leg 3h, heating of windings due to eddy current and increase in high-frequency resistance due to magnetic interference can be suppressed.

Figure 4:
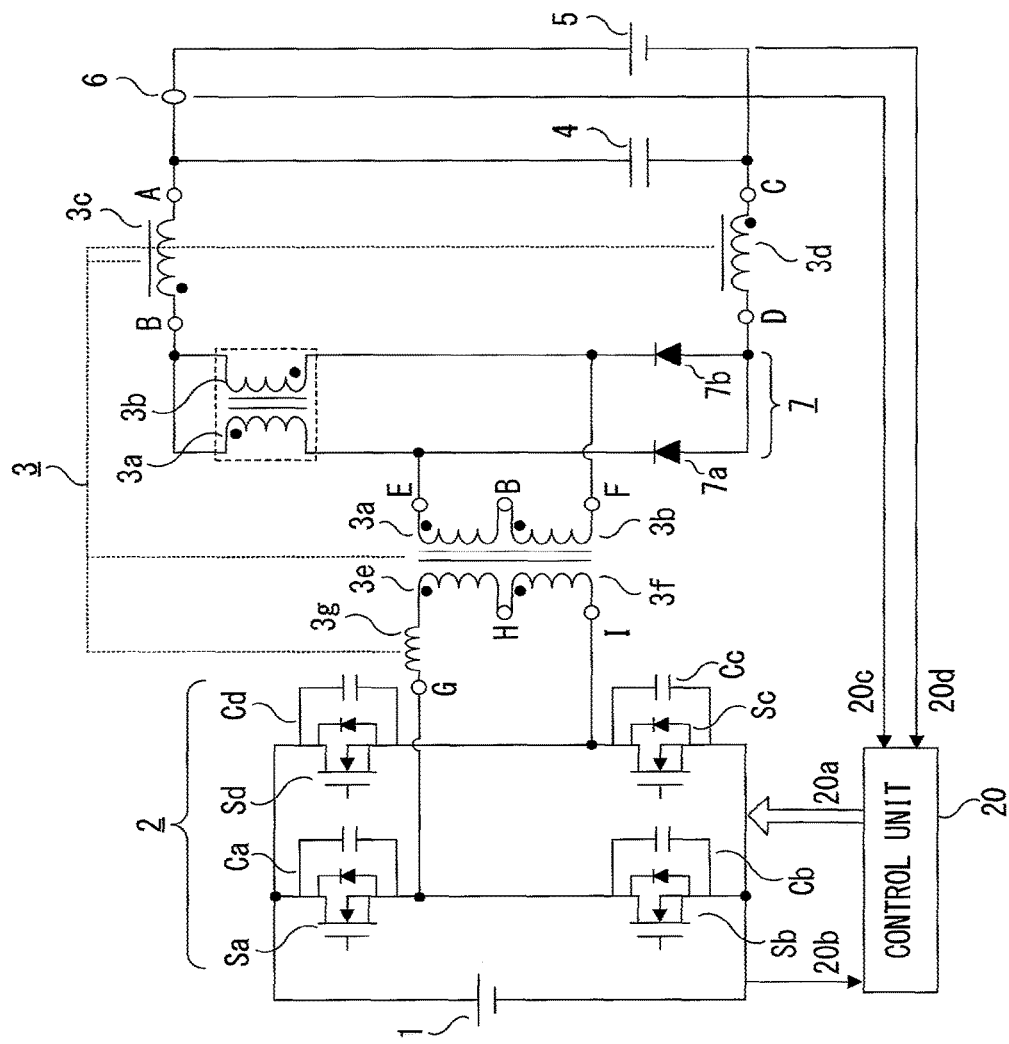
FIG. 4 is a diagram showing the entire configuration of a power conversion device different from FIG. 1, according to embodiment 1 of the present invention.

In FIG. 4, while the same components are used as those in FIG. 1, the power conversion device can also be expressed as a so-called current-doubler configuration because the DC reactor can be configured by the numbers of turns Ns of the first winding 3a and the second winding 3b as shown in expression (9).

In this case, the first winding 3a, the second winding 3b, the fourth winding 3e, and the fifth winding 3f form the transformer, the first winding 3a and the second winding 3b serve also as a winding for current-doubler, and the third windings 3c, 3d form the DC reactor.

Currents having phases inverted from each other flow through the first winding 3a and the second winding 3b. Therefore, employing a current-doubler circuit provides a feature of reducing ripple in current flowing through the third windings 3c, 3d to which a sum of currents flowing through the first winding 3a and the second winding 3b flow.

In FIG. 1, AC voltage obtained by converting DC voltage of the DC voltage source 1 by the switching circuit 2 is applied to the input terminals G, I on the input side of the integrated magnetic component 3. However, considering the gist of the invention of the present application that conventional transformer and DC reactor are integrated to realize the integrated magnetic component 3, it should be understood that the configuration in FIG. 1 does not necessarily need to be used but AC voltage of a separate AC voltage source may be directly applied to the input terminals G, I.

As described above, the power conversion device according to embodiment 1 of the present invention includes: the first winding 3a, the second winding 3b, the fourth winding 3e, and the fifth winding 3f functioning as the transformer; the third windings 3c, 3d functioning as the DC reactor; and the three-leg core with the first winding 3a and the second winding 3b wound around the respective side legs, with the third windings 3c, 3d wound around the center leg, and with the fourth winding 3e and the fifth winding 3f wound around the respective side legs, wherein the winding directions of the first winding 3a, the second winding 3b, and the third windings 3c, 3d are set so that magnetic fluxes generated by DC currents flowing through the respective windings merge in the same direction at the center leg, and the winding directions of the fourth winding 3e and the fifth winding 3f are set so that magnetic fluxes generated by AC currents flowing through the respective windings cancel each other at the center leg. Thus, using the three-leg core, the transformer and the DC reactor are integrated to form the integrated magnetic component 3. Therefore, not only the numbers of turns of the third windings 3c, 3d forming the DC reactor, but also the numbers of turns of the first winding 3a and the second winding 3b of the transformer which is originally a different type of magnetic component having a different function from that of the DC reactor, can contribute to the inductance of the DC reactor, whereby size reduction is achieved.

Further, the winding directions of the fourth winding 3e and the fifth winding 3f are set so that magnetic fluxes generated by AC currents flowing through these respective windings cancel each other at the center leg 3h. Therefore, a leakage magnetic flux does not occur from the gap portion 3k in the center leg 3h, and eddy current loss does not occur at the third windings 3c, 3d wound around the center leg 3h, whereby loss reduction is achieved.

Embodiment 2

Figure 5:
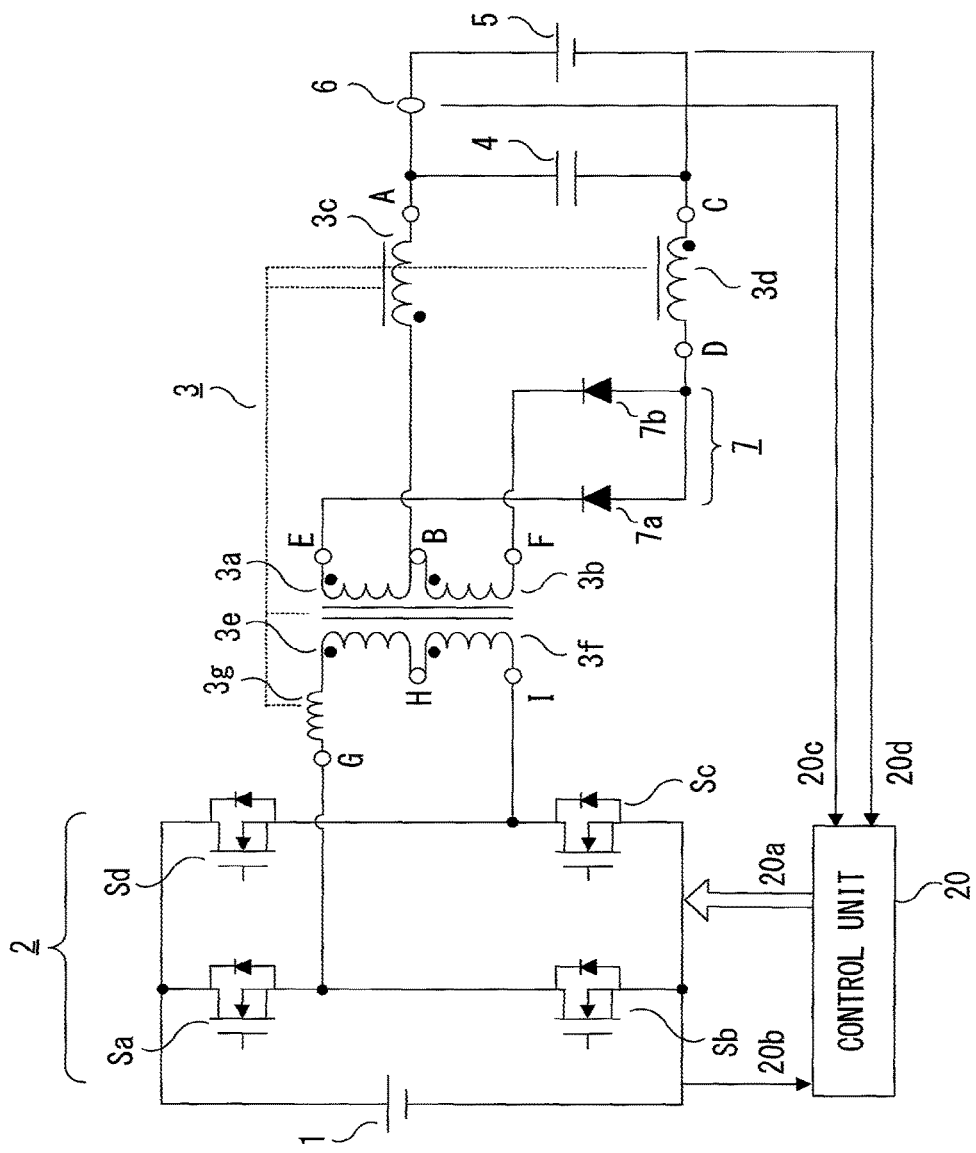
FIG. 5 is a diagram showing the entire configuration of a power conversion device according to embodiment 2 of the present invention.
Figure 6:
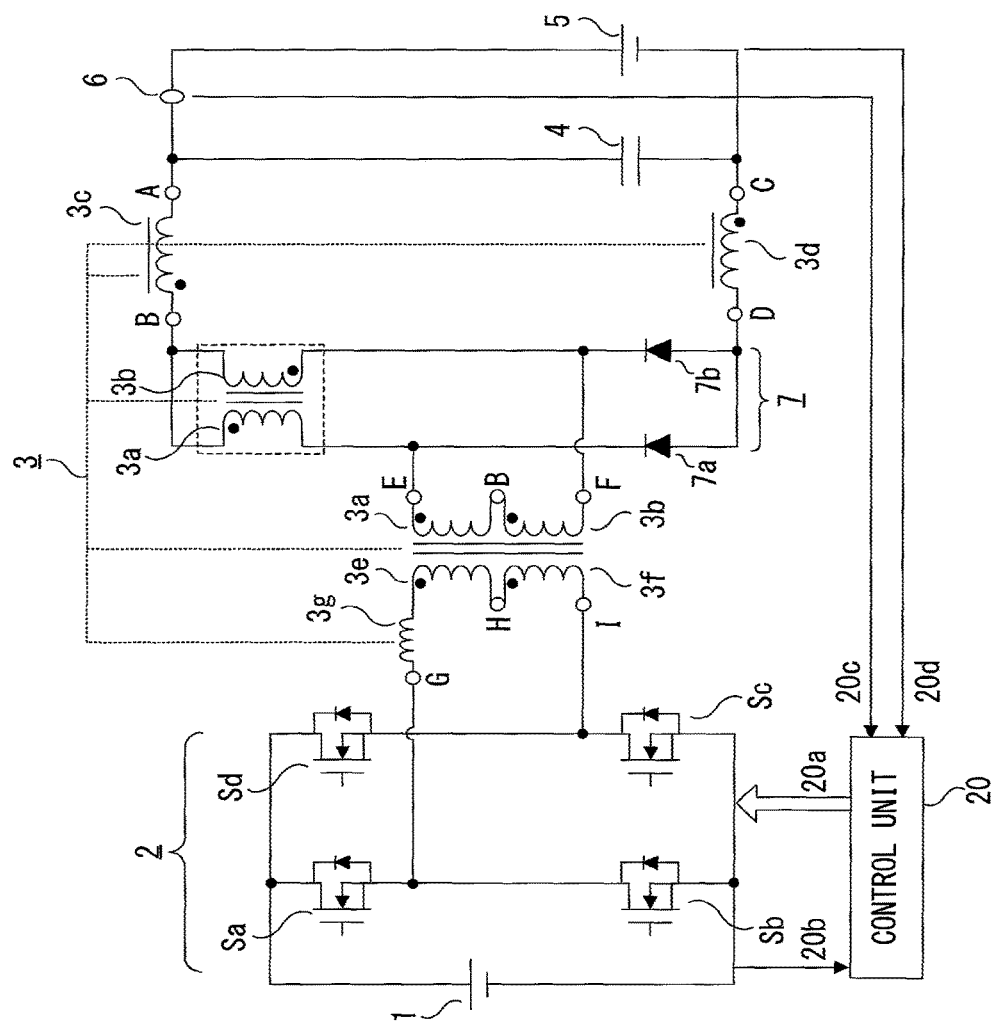
FIG. 6 is a diagram showing the entire configuration of a power conversion device different from FIG. 5, according to embodiment 2 of the present invention.

FIG. 5 and FIG. 6 are diagrams showing the entire configuration of a power conversion device according to embodiment 2 of the present invention.

In the configurations in FIG. 5 and FIG. 6, as compared to FIG. 1 and FIG. 3 in the above embodiment 1, the resonance capacitors Ca to Cd between the drains and sources of the switching elements Sa to Sd composing the switching circuit 2 are not Provided, and the switching elements Sa to Sd are subjected to so-called hard switching.

As described in the above embodiment 1, if the resonance capacitors Ca to Cd are connected, switching at zero voltage can be performed owing to resonance with the leakage inductance 3g, but in FIG. 5 and FIG. 6 in the present embodiment 2, the capacitors Ca to Cd are not present and therefore there is concern about increase in switching loss.

Figure 7:
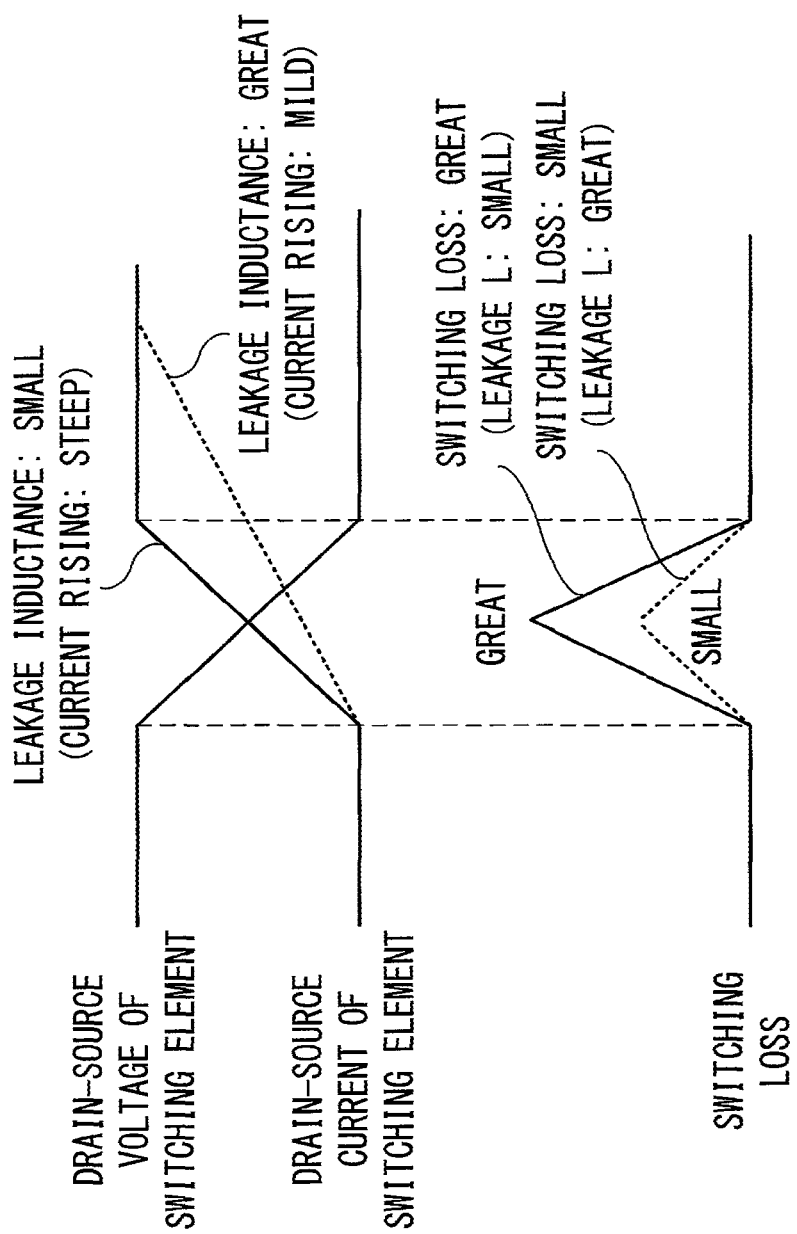
FIG. 7 illustrates operation of reducing switching loss in the switching circuit 2 shown in FIG. 5 and FIG. 6.

Accordingly, here, as described in embodiment 1, the leakage inductance 3g of the transformer can be adjusted through adjustment of the numbers of turns of the third windings 3c, 3d of the integrated magnetic component 3, and as shown in FIG. 7, if the leakage inductance is increased, current when each switching element Sa to Sd is turned on is limited, whereby an effect that switching loss can be reduced is obtained.

Embodiment 3

Figure 8:
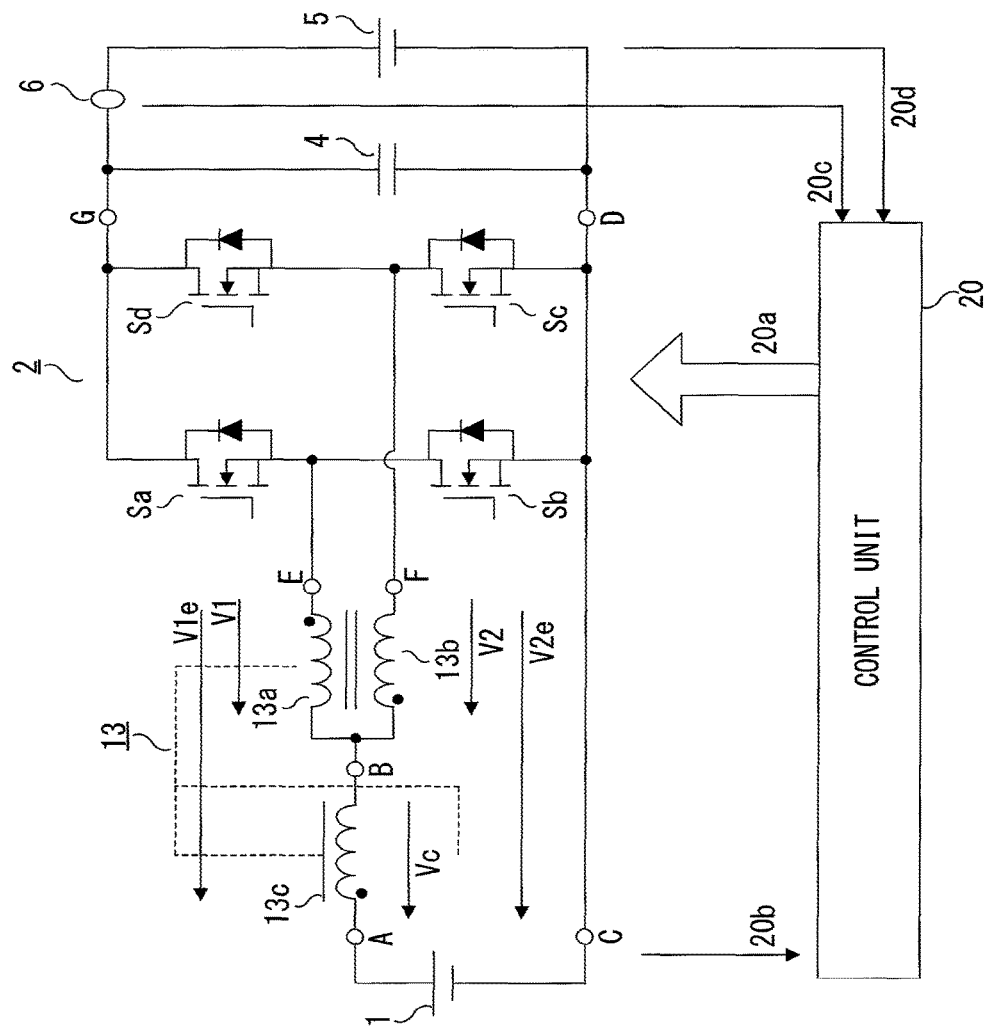
FIG. 8 is a diagram showing the entire configuration of a power conversion device according to embodiment 3 of the present invention.

FIG. 8 is a diagram showing the entire configuration of a power conversion device according to embodiment 3 of the present invention. The power conversion device in FIG. 8 includes, as a whole: an integrated magnetic component 13 of which the input side is connected to a DC voltage source 1 and which is formed by integrating a DC reactor and a coupled reactor which have been conventionally treated as different types of magnetic components; a switching circuit 2 connected to the output side of the integrated magnetic component 13; a filter capacitor 4 connected to the output side of the switching circuit 2 in parallel with a DC voltage source (or load) 5; and a control unit 20 for controlling the switching circuit 2. The power conversion device steps up DC voltage of the DC voltage source 1 and outputs the stepped-up DC voltage to DC terminals G, D.

Hereinafter, the details of the above components will be described.

The integrated magnetic component 13 includes: a third winding 13c which has one end A connected to a positive pole of the DC voltage source 1 and which is a DC winding functioning as a DC reactor; and a first winding 13a and a second winding 13b which have respective ends connected to another end B of the third winding 13c and which form a coupled winding functioning as a coupled reactor.

The switching circuit 2 is configured in a bridge form in which arms having switching elements Sa, Sb, Sc, Sd are connected in parallel two by two on the upper and lower sides. The intermediate connection point between the upper and lower arms having the switching elements Sa, Sb is connected to another end E of the first winding 13a, and the intermediate connection point between the upper and lower arms having the switching elements Sd, Sc is connected to another end F of the second winding 3b. A negative pole C of the DC voltage source 1 is connected to a negative pole D of DC terminals.

The control unit 20 generates a drive signal 20a for driving the switching circuit 2, on the basis of voltage information 20b from the DC voltage source 1, current information 20c from the current sensor 6, and voltage information 20d from the DC voltage source 5 which is output voltage, thereby controlling the switching elements Sa, Sb, Sc, Sd so as to achieve target output voltage.

In FIG. 8, a configuration in which one third winding 13c is provided is shown for convenience of circuit operation explanation. However, as in the third windings 3c, 3d in the above embodiment 1, considering noise-filter designing, the third winding may be divided into two windings with the DC voltage source 1 therebetween.

Next, the details of the integrated magnetic component 13 will be described. First, as a premise thereof, step-up operation in FIG. 8 will be described with reference to FIG. 9 and FIG. 10 showing the corresponding operation waveforms.

There are four types of operation modes (a), (b), (c), (d), depending on the operation states of the switching elements Sb, Sc. The switching elements Sa, Sd operate, for synchronous rectification, complementarily with respect to the switching elements Sb, Sc.

Figure 10A:
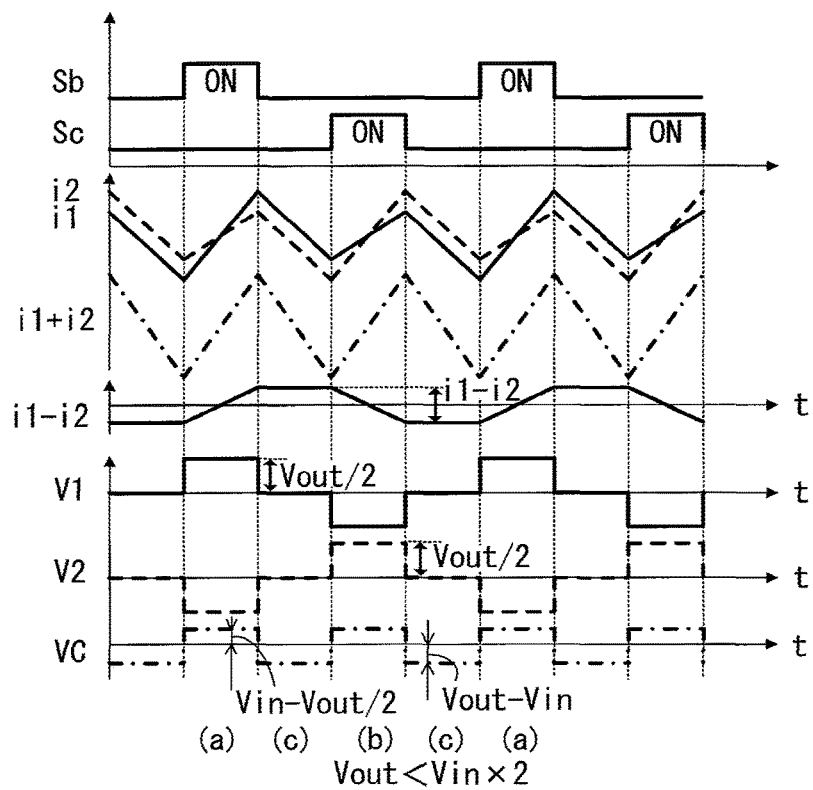
FIG. 10 is a waveform diagram of the operation shown in FIG. 9.
Figure 10B:
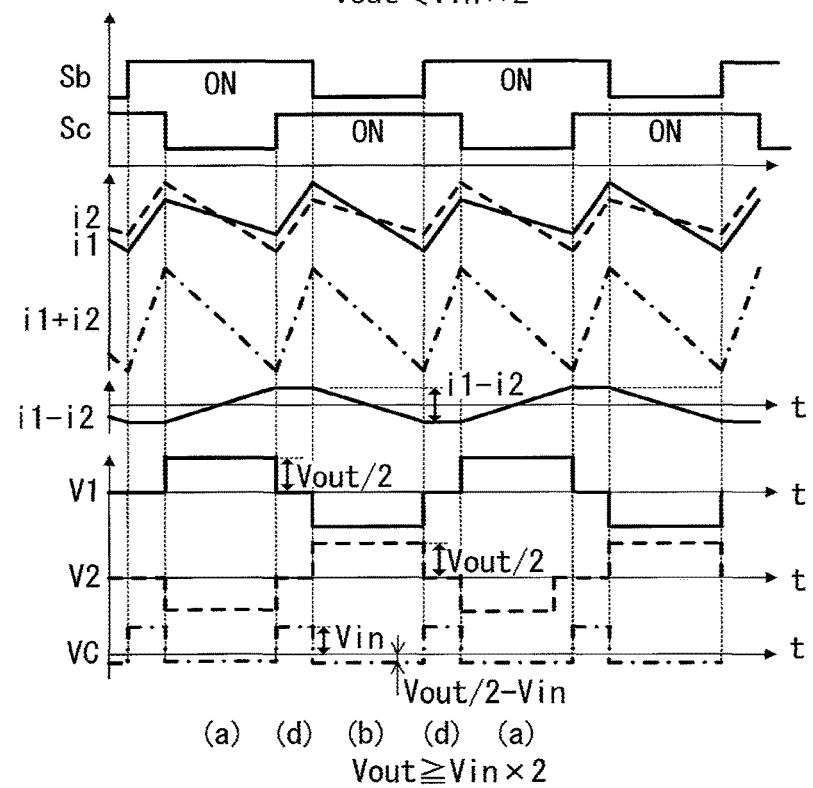

In addition, the operation differs between the case where output voltage Vout is equal to or smaller than twice input voltage Vin and the case where output voltage Vout is equal to or greater than twice input voltage Vin. In the case where output voltage Vout is equal to or smaller than twice input voltage Vin, operation in order of (a), (c), (b), (c), then (a) is repeated (FIG. 10A), and in the case where output voltage Vout is equal to or greater than twice input voltage Vin, operation in order of (a), (d), (b), (d), then (a) is repeated (FIG. 10B).

Figure 9A:
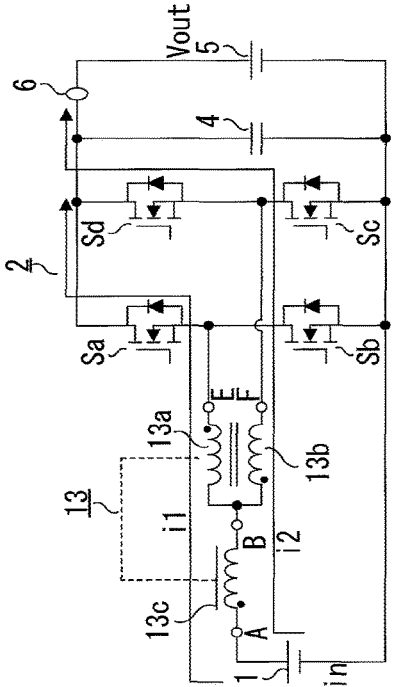
FIG. 9 illustrates step-up operation of the power conversion device according to embodiment 3 of the present invention.

In a state of operation mode (a), Sb is ON and Sc is OFF, and the following current loops are formed: current flows from the DC voltage source 1 through the third winding 13c, the first winding 13a, and then the switching element Sb to return to the DC voltage source 1; and current flows from the DC voltage source 1 through the third winding 13c, the second winding 13b, the switching element Sd, and then the DC voltage source 5 as a load, to return to the DC voltage source 1 (FIG. 9A).

At this time, the first winding 13a and the second winding 13b are magnetically coupled to form a coupled reactor, and therefore current i2 to the load increases due to induction by i1.

Figure 9B:
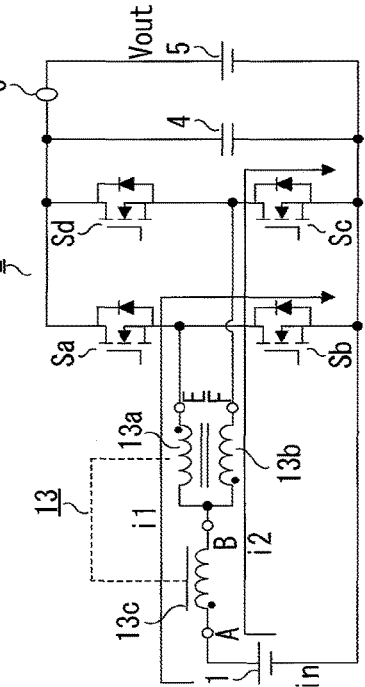

In a state of operation mode (b), Sb is OFF and Sc is ON, and the following current loops are formed: current flows from the DC voltage source 1 through the third winding 13c, the second winding 13b, and then the switching element Sc to return to the DC voltage source 1; and current flows from the DC voltage source 1 through the third winding 13c, the first winding 13a, the switching element Sa, and then the DC voltage source 5 as a load, to return to the DC voltage source 1 (FIG. 9B).

At this time, the first winding 13a and the second winding 13b are magnetically coupled to form a coupled reactor, and therefore current i1 to the load increases due to induction by i2.

Figure 9C:
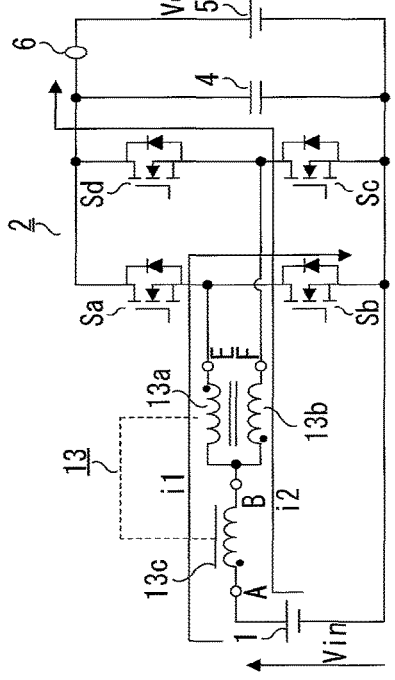

In a state of operation mode (c), Sb is OFF and Sc is OFF, and the following current loops are formed: current flows from the DC voltage source 1 through the third winding 13c, the first winding 13a, the switching element Sa, and then the DC voltage source 5 as a load, to return to the DC voltage source 1; and current flows from the DC voltage source 1 through the third winding 13c, the second winding 13b, the switching element Sd, and then the DC voltage source 5 as a load, to return to the DC voltage source 1 (FIG. 9C).

At this time, the slopes of the currents i1, i2 become equal to each other, and the first winding 13a and the second winding 13b are not excited and thus do not function as a coupled reactor.

Figure 9D:
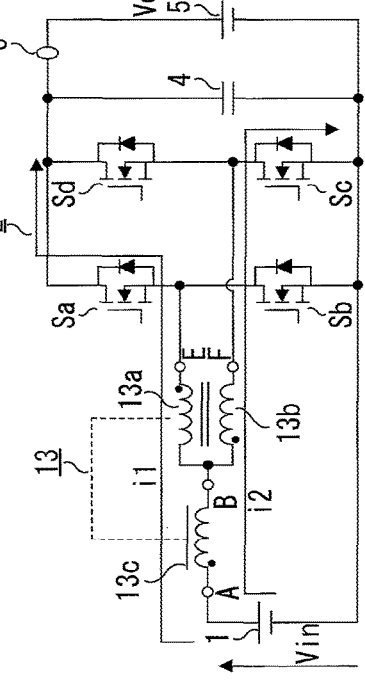

In a state of operation mode (d), Sb is ON and Sc is ON, and the following current loops are formed: current flows from the DC voltage source 1 through the third winding 13c, the first winding 13a, and then the switching element Sb to return to the DC voltage source 1; and current flows from the DC voltage source 1 through the third winding 13c, the second winding 13b, and then the switching element Sc to return to the DC voltage source 1 (FIG. 9D).

At this time, the slopes of the currents i1, i2 become equal to each other, and the first winding 13a and the second winding 13b are not excited and thus do not function as a coupled reactor.

Figure 11A:
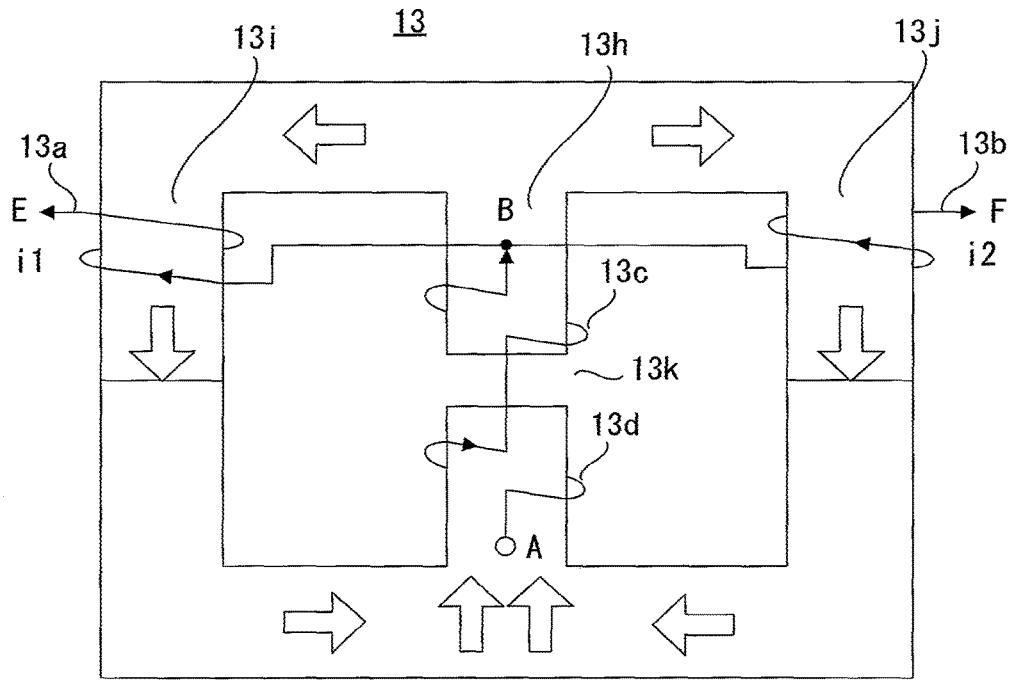
FIG. 11 is a diagram showing flow of a DC magnetic flux and a magnetomotive force (MMF) in an integrated magnetic component 13 shown in FIG. 8.
Figure 11B:
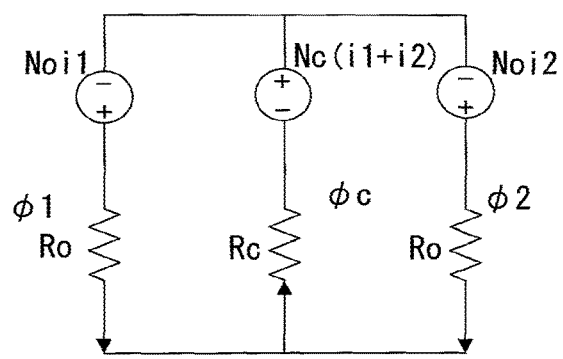

Next, the detailed configuration of the integrated magnetic component 13 and the operation thereof will be described with reference to FIG. 11. FIG. 11 is a diagram showing flow of a DC magnetic flux (FIG. 11A) and a magnetomotive force (MMF) (FIG. 11B) in the integrated magnetic component 13 in FIG. 8.

In FIG. 11A, the core is a three-leg core formed of two side legs, i.e., a first side leg 13i and a second side leg 13j, and a center leg 13h having a gap portion 13k, and is generally formed by, as shown in FIG. 11A, combining so-called EE-type cores symmetric between upper and lower sides or so-called EI-type cores asymmetric between upper and lower sides. It is noted that, at the center leg 13h, the gap portion 13k is provided for preventing DC magnetic flux saturation.

It is noted that a DC magnetic flux flowing through the center leg 13h is twice as great as DC magnetic fluxes flowing through the side legs 13i, 13j. Therefore, if the sectional area of the center leg 13h is designed to be twice as great as the sectional areas of the side legs 13i, 13j, a phenomenon of core saturation due to DC superimposition can be prevented.

Reference characters in FIG. 11 denote the following things.

No: number of turns of first winding 13a, second winding 13b

Nc: number of turns of third winding 13c i1: current flowing through first winding 13a i2: current flowing through second winding 13b

Ro: magnetic resistance of first side leg 13i, second side leg 13j

Rc: magnetic resistance of center leg 13h

φ1: magnetic flux flowing through first side leg 13i

φ2: magnetic flux flowing through second side leg 13j

φc: magnetic flux flowing through center leg 13h

As shown in FIG. 11A, the first winding 13a is wound around the first side leg 3i, the second winding 13b is wound around the second side leg 3j, and the third winding 13c is wound around the center leg 13h.

The winding directions of the first winding 13a, the second winding 13b, and the third winding 13c are set so that magnetic fluxes (indicated by arrows in the drawing) generated by DC currents flowing through these respective windings merge in the same direction (upward in the drawing) at the center leg 13h.

In FIG. 11A, the first winding 13a and the second winding 13b are wound around the first side leg 13i and the second side leg 13j, respectively. However, as long as the above winding-direction condition is satisfied, conversely, the first winding 13a and the second winding 13b may be wound around the second side leg 13j and the first side leg 3i, respectively.

FIG. 11B shows a magnetomotive force in a magnetic circuit formed by the integrated magnetic component 13. For example, a magnetomotive force (ampere-turn) when current i1 flows through the first winding 13a wound around the first side leg 13i is represented as Noi1.

In FIG. 8 and FIG. 11, the first winding 13a and the second winding 13b functioning as a coupled reactor correspond to a winding coupled body described in claim 1 of the present application, and the third winding 13c corresponds to a DC reactor described therein. Similarly, the switching elements Sa to Sd forming the switching circuit 2 correspond to a nonlinear element described therein. Further, the three-leg core formed of the two side legs 13i, 13j and the center leg 13h having the gap portion 13k shown in FIG. 11 correspond to a multi-leg core described therein.

Next, it will be described that, in the present application, integrating the DC reactor and the coupled reactor which are originally different types of magnetic components allows the number of turns of the coupled reactor to contribute to formation of inductance of the DC reactor, and further, the coupling degree between the first winding 13a and the second winding 13b can be adjusted through changing of the magnetic resistance Rc of the center leg 13h.

In the magnetic circuit in FIG. 11B from a relationship in which the magnetic potentials (i.e., current×number of turns (magnetomotive force)–magnetic flux×magnetic resistance) of the three legs are equal to each other, and a relationship of φ1+φ2=φc, the following expression (15) is derived.

[Mathematical 9]

$$\begin{pmatrix} \phi_1 \\ \phi_2 \\ \phi_c \end{pmatrix} = \begin{pmatrix} \dfrac{Ro+Rc}{Ro^2+2Ro\times Rc} & \dfrac{-Rc}{Ro^2+2Ro\times Rc} & \dfrac{Ro}{Ro^2+2Ro\times Rc} \\ \dfrac{-Rc}{Ro^2+2Ro\times Rc} & \dfrac{Ro+Rc}{Ro^2+2Ro\times Rc} & \dfrac{Ro}{Ro^2+2Ro\times Rc} \\ \dfrac{Ro}{Ro^2+2Ro\times Rc} & \dfrac{Ro}{Ro^2+2Ro\times Rc} & \dfrac{2Ro}{Ro^2+2Ro\times Rc} \end{pmatrix} \begin{pmatrix} No\times i1 \\ No\times i2 \\ Nc\times ic \end{pmatrix} \quad (15)$$

If voltage generated in the first winding 13a is denoted by V1, voltage generated in the second winding 13b is denoted by V2, and voltage generated in the third winding 13c is denoted by Vc, relationships of V1=No×dφ1/dt, V2=No×dφ2/dt, and Vc=Nc×dφc/dt are satisfied. If expression (15) is deformed using these relationships, V1, V2, and Vc are represented by expression (16) and expression (17).

[Mathematical 10]

$$\begin{pmatrix} V1 \\ V2 \\ Vc \end{pmatrix} = A \begin{pmatrix} \dfrac{d}{dt}i1 \\ \dfrac{d}{dt}i2 \\ \dfrac{d}{dt}ic \end{pmatrix} \quad (16)$$

$$A = \begin{pmatrix} \dfrac{No^2\times(Ro+Rc)}{Ro^2+2Ro\times Rc} & \dfrac{No^2\times(-Rc)}{Ro^2+2Ro\times Rc} & \dfrac{NoNc(Ro)}{Ro^2+2Ro\times Rc} \\ \dfrac{No^2\times(-Rc)}{Ro^2+2Ro\times Rc} & \dfrac{No^2\times(Ro+Rc)}{Ro^2+2Ro\times Rc} & \dfrac{NoNc\times(Ro)}{Ro^2+2Ro\times Rc} \\ \dfrac{NoNc\times(Ro)}{Ro^2+2Ro\times Rc} & \dfrac{NoNc\times(Ro)}{Ro^2+2Ro\times Rc} & \dfrac{Nc^2\times(2Ro)}{Ro^2+2Ro\times Rc} \end{pmatrix} \quad (17)$$

Since the magnetic coupling between the first winding 13a and the second winding 13b is reversible, if self-inductance of the first winding 13a wound around the first side leg 13i and self-inductance of the second winding 13b wound around the second side leg 13j are denoted by Lo, self-inductance of the third winding 13c wound around the center leg 13h is denoted by Lc, mutual inductance between the first winding 13a and the second winding 13b is denoted by Mo, and mutual inductance between the third winding 13c, and the first winding 13a, the second winding 13b is denoted by Mc, expression (16) is represented as expression (18).

[Mathematical 11]

$$\begin{pmatrix} V1 \\ V2 \\ Vc \end{pmatrix} = \begin{pmatrix} Lo & -Mo & Mc \\ -Mo & Lo & Mc \\ Mc & Mc & Lc \end{pmatrix} \begin{pmatrix} \frac{d}{dt}i1 \\ \frac{d}{dt}i2 \\ \frac{d}{dt}ic \end{pmatrix} \quad (18)$$

From a relationship of is =i1+i2, expression (18) is deformed to obtain expression (19).

[Mathematical 12]

$$\begin{pmatrix} V1 \\ V2 \\ Vc \end{pmatrix} = \begin{pmatrix} Lo+Mc & -Mo+Mc \\ -Mo+Mc & Lo+Mc \\ Lc+Mc & Lc+Mc \end{pmatrix} \begin{pmatrix} \frac{d}{dt}i1 \\ \frac{d}{dt}i2 \end{pmatrix} \quad (19)$$

In addition, if the expression (17) and the expression (18) are associated with each other, Lo, Lc, Mo, and Mc are respectively represented by the following expression (20) to expression (23).

[Mathematical 13]

$$Lo = No^2 \frac{Ro + Rc}{Ro^2 + 2Ro \times Rc} \quad (20)$$

$$Lc = Nc^2 \frac{2Ro}{Ro^2 + 2Ro \times Rc} \quad (21)$$

$$Mo = Mo^2 \frac{Rc}{Ro^2 + 2Ro \times Rc} \quad (22)$$

$$Mc = NoNc \frac{Ro}{Ro^2 + 2Ro \times Rc} \quad (23)$$

If the coupling degree between the first winding 13a and the second winding 13b is denoted by ko and the coupling degree between the third winding 13c, and the first winding 13a, the second winding 13b is denoted by kc, ko and kc are respectively represented by the following expression (24) and expression (25).

[Mathematical 14]

$$ko = \frac{Mo}{\sqrt{LoLo}} = \frac{Rc}{Ro+Rc} \quad (24)$$

$$kc = \frac{Mc}{\sqrt{LoLc}} = \frac{Ro}{\sqrt{2Ro(Ro+Rc)}} \quad (25)$$

If voltage between the third winding 13c and the first winding 13a is denoted by V1e(A-E) and voltage between the third winding 13c and the second winding 13b is denoted by V2e(A-F), the following expression (26) and expression (27) are satisfied.

[Mathematical 15]

$$V1e = V1 + Vc \quad (26)$$

$$V2e = V2 + Vc \quad (27)$$

If expression (19) is substituted into expression (26) and expression (27), voltages V1e, V2e are represented by the following expression (28).

[Mathematical 16]

$$\begin{pmatrix} V1e \\ V2e \end{pmatrix} = \begin{pmatrix} Lo+Lc+2Mc & Lc-Mo+2Mc \\ Lc-Mo+2Mc & Lc-Mo+2Mc \end{pmatrix} \begin{pmatrix} \frac{d}{dt}i1 \\ \frac{d}{dt}i2 \end{pmatrix} \quad (28)$$

If the DC inductance of the third winding 13c is denoted by L and the excitation inductance of the first winding 13a and the second winding 13b is denoted by Lm, from voltage equations, voltages V1e, V2e are represented by the following expression (29) and expression (30).

[Mathematical 17]

$$V1e = -Lm\left(\frac{d}{dt}i2 - \frac{d}{dt}i1\right) + L\frac{d}{dt}i1 \quad (29)$$

$$V2e = Lm\left(\frac{d}{dt}i2 - \frac{d}{dt}i1\right) + L\frac{d}{dt}i2 \quad (30)$$

From comparison of current derivative terms between expression (28) and expressions (29), (30), the DC inductance L of the third winding 13c and the excitation inductance Lm of the first winding 13a and the second winding 13b are obtained, and further, using expression (24) and expression (25), the DC inductance L and the excitation inductance Lm are represented by the following expression (31) and expression (32).

[Mathematical 18]

$$L = Lo + 2Lc + 4Mc - Mo = \frac{No^2 + 4Nc^2 + 4NoNc}{Ro + 2Rc} \quad (31)$$

$$= (1-ko)Lo + 4kc\sqrt{LoLc} + 2Lc$$

$$Lm = Mo - Lc - 2Mc = \frac{No^2 Rc - 2Nc^2 Ro - 2NoNcRo}{Ro^2 + 2RoRc} \quad (32)$$

$$= -Lc + koLo - 2kc\sqrt{LoLc}$$

From expression (31), it is found that, as a result of magnetic integration, the numbers of turns No of the first winding 13a and the second winding 13b, which would be irrelevant if they are separate bodies, contribute to formation of inductance of the third winding 13c, and thus the DC inductance can be formed with a smaller number of turns than in the case where magnetic integration is not performed.

The inductance L obtained by the third winding 13c can be increased by increasing the numbers of turns No of the first winding 13a and the second winding 13b and decreasing the magnetic resistance Rc of the center leg 13h to decrease the coupling degree ko. Thus, the leakage inductance of the coupled reactor can be utilized as the DC reactor.

In addition, the inductance L obtained by the third winding 13c can be increased by decreasing the magnetic resistance Rc of the center leg 13h to increase the coupling degree kc between the third winding 13c, and the first winding 13a, the second winding 13b.

In this way, if the magnetic integration configuration is employed and thereby the DC inductance L is increased, current change during a period during which the first winding 13a and the second winding 13b do not function as a coupled reactor in the operation modes (c), (d) described above in FIG. 9 and FIG. 10 is suppressed and thus current ripple can be reduced.

In addition, from expression (32), it is found that the excitation inductance Lm of the first winding 13a and the second winding 13b forming a coupled reactor can be adjusted by the number of turns Nc of the third winding 13c.

Lm which is the excitation inductance can be increased by increasing the numbers of turns No of the first winding 13a and the second winding 13b, decreasing the number of turns Nc of the third winding 13c, increasing the coupling degree ko, and decreasing the coupling degree kc between the first winding 13a, and the second winding 13b, the third winding 13c.

In this way, if the magnetic integration configuration is employed and thereby the excitation inductance Lm is increased, current gradient in the operation modes (a), (b) described above in FIG. 9 and FIG. 10 can be reduced.

As means for changing the magnetic resistance Rc of the center leg 13h, since the magnetic resistance Rc is the magnetic resistance of the center leg 13h, the dimension of the gap portion 13k provided at the center leg 13h, the sectional area of the center leg 13h, or the magnetic permeability of the core material may be changed.

Next, it will be described that AC magnetic fluxes are cancelled in the gap portion 13k provided at the center leg 13h of the core.

Figure 12A:
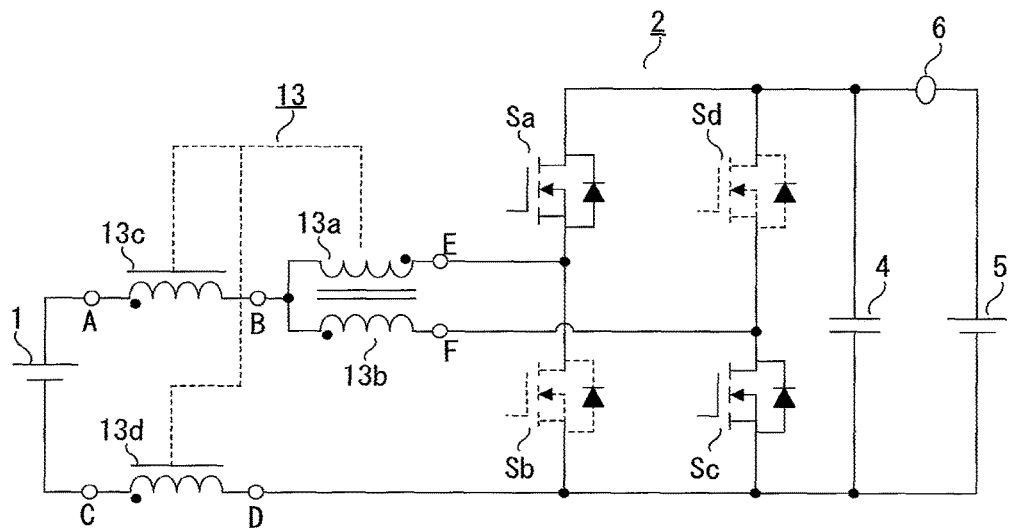
FIG. 12 is a diagram showing flow of an AC magnetic flux in the integrated magnetic component 13 shown in FIG. 8.
Figure 12B:
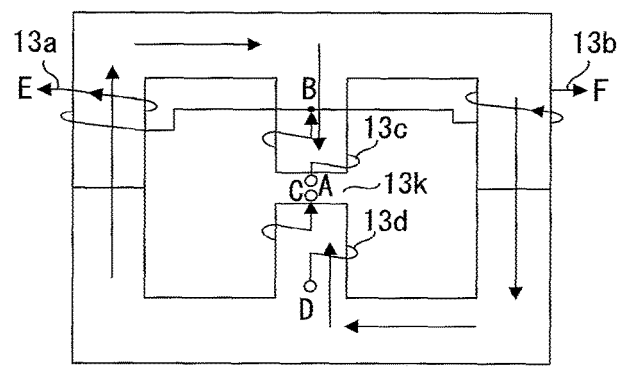
Figure 12C:
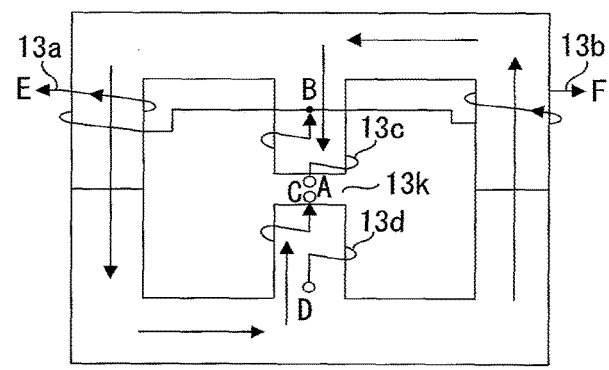

FIG. 12 shows flow of magnetic fluxes due to AC component (ripple) currents flowing through the first winding 13a and the second winding 13b. In FIG. 12B and FIG. 12C, as for currents flowing through the first winding 13a and the second winding 13b, certain directions of DC current components are shown, but the directions of the magnetic fluxes are as shown in the drawing according to the polarities of both windings composing the coupled reactor, and at the center leg 13h, the AC magnetic fluxes have such directions as to cancel each other and therefore are cancelled. Thus, there is no leakage of AC magnetic flux from the gap portion 13k, and even if windings are provided to the center leg 13h, heating of windings due to eddy current and increase in high-frequency resistance due to magnetic interference can be suppressed.

It is noted that, as mentioned above, in FIG. 12, the third winding is divided into two windings 13c, 13d, and the windings 13c, 13d are provided on both pole sides of the DC voltage source 1.

In the above description in FIG. 8, etc., the power conversion device is configured such that a three-leg core is provided, a DC winding as a DC reactor is wound around the center leg thereof, two coupled windings as a coupled reactor are wound around both side legs thereof, and two upper arms and two lower arms are respectively connected in parallel as the switching circuit 2.

However, in view of the technical idea of the invention of the present application that the DC reactor and the coupled reactor which are originally different types of magnetic components are integrated, needless to say, the present invention is directly applicable also to a power conversion device in which a multi-leg core having n (n is an integer equal to or greater than 2) number of side legs and a center leg is provided, a DC winding as a DC reactor is wound around the center leg, n number of coupled windings as a coupled reactor are wound around the n number of side legs, and n number of upper arms and n number of lower arms are respectively connected in parallel as the switching circuit.

As described above, in the power conversion device according to embodiment 3 of the present invention, the third winding 13c functioning as a DC reactor is wound around the center leg 13h of the three-leg core, the first winding 13a and the second winding 13b functioning as a coupled reactor are wound around both side legs 13i, 13j, the winding directions of the windings 13a to 13c are set so that magnetic fluxes generated by DC currents flowing through these respective windings merge in the same direction at the center leg 13h, whereby, using the three-leg core, the coupled reactor and the DC reactor are integrated to form the integrated magnetic component 13. As a result, not only the number of turns of the third winding 13c forming the DC reactor, but also the numbers of turns of the first winding 13a and the second winding 13b forming the coupled reactor which is originally a different type of magnetic component having a different function from that of the DC reactor, can contribute to inductance of the DC reactor, whereby size reduction is achieved. Further, an AC leakage magnetic flux does not occur in the gap portion 13k of the center leg 13h, and eddy current loss does not occur in the third winding 13c wound around the center leg 13h, whereby loss reduction is achieved.

Embodiment 4

Figure 13:
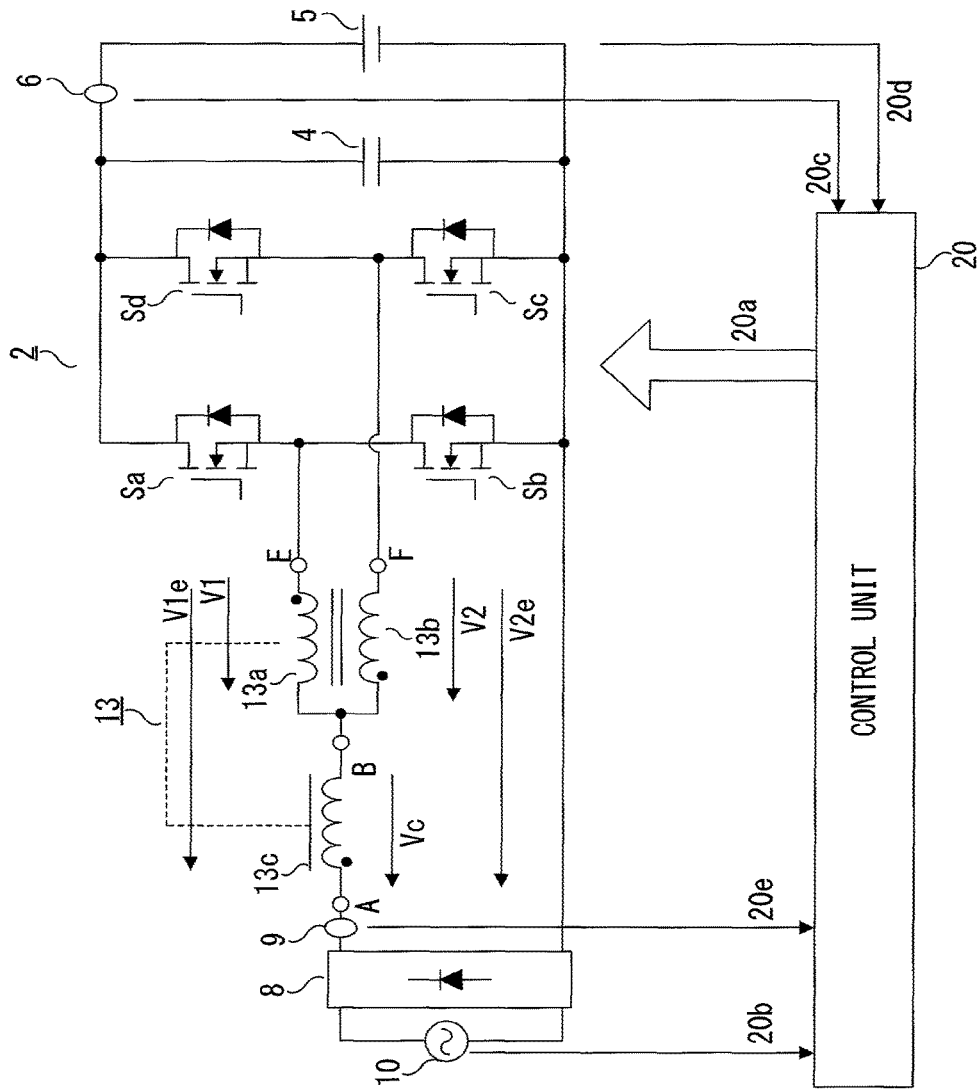
FIG. 13 is a diagram showing the entire configuration of a power conversion device according to embodiment 4 of the present invention.

FIG. 13 is a diagram showing the entire configuration of a power conversion device according to embodiment 4 of the present invention. In the above embodiment 3, the case where the integrated magnetic component 13 is applied to the DC/DC converter which is the power conversion device, has been shown. However, in FIG. 13, the integrated magnetic component 13 is applied to an AC/DC converter.

Here, the DC voltage source 1 in FIG. 8 is replaced with an AC voltage source 10, and a bridge-type rectification circuit 8 is provided between the AC voltage source 10 and the third winding 13c.

The switching modes in the step-up operation are the same as those shown in FIG. 9 and FIG. 10, and the switching circuit 2 is operated so as to perform high power factor operation in which input current has the same phase as input voltage, whereby the same effect as in embodiment 3 can be obtained.

In the above description, the case where the invention of the present application is applied to a power conversion device that converts AC voltage to DC voltage has been shown in the above embodiments 1 and 2, and the case where the invention of the present application is applied to a power conversion device that steps up DC voltage has been shown in the above embodiments 3 and 4.

However, as can be understood from the description in the above embodiments 1 and 3 regarding the relationship between the components in these embodiments and components described in claim 1 of the present application, the invention of the present application is not limited to the power conversion devices described above.

That is, the invention of the present application is applicable, similarly as described above, also to: a magnetic component assembly that includes a DC reactor, a winding coupled body, a nonlinear element, and a multi-leg core described in claim 1 of the present application, wherein the winding directions of the windings are set so that magnetic fluxes generated by DC currents flowing through the windings of the winding coupled body and the winding of the DC reactor merge in the same direction at the center leg of the multi-leg core, whereby the DC reactor and the winding coupled body are integrated; and various types of power conversion devices and the like using the magnetic component assembly, and thus the same effect is provided.

It is noted that, within the scope of the present invention, the above embodiments may be freely combined with each other, or each of the above embodiments may be modified or simplified as appropriate.

The invention claimed is:

1. A power conversion device using a magnetic component assembly,
wherein the magnetic component assembly comprises:
a winding coupled body formed of n number of windings magnetically coupled with each other, n being an integer greater than 1, one end of each winding being connected in series to a DC voltage source via a DC reactor, other ends of the windings being connected to nonlinear elements which become conductive at timings different from each other; and
a multi-leg core formed of n number of side legs and a center leg having a gap portion, wherein
the n number of windings of the winding coupled body are wound around the respective side legs of the multi-leg core, a winding of the DC reactor is wound around the center leg of the multi-leg core, and winding directions of the windings of the winding coupled body and the winding of the DC reactor are set so that magnetic fluxes generated by DC currents flowing through the windings of the winding coupled body and the winding of the DC reactor merge in the same direction at the center leg of the multi-leg core, whereby the DC reactor and the winding coupled body are integrated using the multi-leg core,
wherein the power conversion device steps up DC voltage of the DC voltage source and outputting the stepped-up voltage to DC terminals, and the power conversion device comprises:
the DC reactor including a DC winding having one end connected to the DC voltage source;
a coupled reactor which is the winding coupled body and which includes coupled windings composed of the n number of windings, respective ends of the coupled windings being connected to another end of the DC reactor;
a switching circuit having n number of upper arms and n number of lower arms which have switching elements as the nonlinear elements and are respectively connected in parallel between both poles of the DC terminals, intermediate connection points between the upper arms and the lower arms being respectively connected to other ends of the coupled windings; and
the multi-leg core with the coupled windings respectively wound around the side legs, and with the DC winding wound around the center leg, wherein
winding directions of the DC winding and the coupled windings are set so that magnetic fluxes generated by DC currents flowing through the DC winding and the coupled windings merge in the same direction at the center leg, whereby the coupled reactor and the DC reactor are integrated using the multi-leg core.

2. The power conversion device according to claim 1, wherein
the number n is 2, the coupled reactor has a first winding and a second winding as the coupled windings, the DC reactor has a third winding as the DC winding, and the multi-leg core is formed as a three-leg core having two of the side legs and the center leg, the first winding and the second winding being wound around the respective side legs, the third winding being wound around the center leg, and
winding directions of the first winding, the second winding, and the third winding are set so that magnetic fluxes generated by DC currents flowing through the first winding, the second winding, and the third winding merge in the same direction at the center leg, whereby the coupled reactor and the DC reactor are integrated using the three-leg core.

3. The power conversion device according to claim 2, wherein
an inductance of the DC reactor is adjustable through changing of the numbers of turns of the first winding and the second winding.

4. The power conversion device according to claim 2, wherein a coupling degree between the first winding and the second winding is adjustable through changing of a magnetic resistance of the center leg.

5. The power conversion device according to claim 2, wherein
in a case where DC voltage of the DC voltage source is stepped up to be equal to or higher than twice the original voltage and the resultant voltage is outputted to the DC terminals, during a period during which DC voltage of the DC voltage source is applied to the first winding and the second winding at the same time, current flowing through the first winding and the second winding during the period is limited by an inductance of the DC reactor and a leakage inductance of the coupled reactor.

6. The power conversion device according to claim 2, wherein
the third winding is composed of two divided windings wound around the center leg, one of the two divided windings being provided on a positive pole side of the DC voltage source, the other one being provided on a negative pole side of the DC voltage source.

7. The power conversion device according to claim 2, wherein
a sectional area of the center leg is twice as great as a sectional area of each side leg.

8. A power conversion device using a magnetic component assembly,
wherein the magnetic component assembly comprises:
a winding coupled body formed of n number of windings magnetically coupled with each other, n being an integer greater than 1, one end of each winding being connected in series to a DC voltage source via a DC reactor, other ends of the windings being connected to nonlinear elements which become conductive at timings different from each other; and
a multi-leg core formed of n number of side legs and a center leg having a gap portion, wherein
the n number of windings of the winding coupled body are wound around the respective side legs of the multi-leg core, a winding of the DC reactor is wound around the center leg of the multi-leg core, and winding directions of the windings of the winding coupled body and the winding of the DC reactor are set so that magnetic fluxes generated by DC currents flowing through the windings of the winding coupled body and the winding of the DC reactor merge in the same direction at the center leg of the multi-leg core, whereby the DC reactor and the winding coupled body are integrated using the multi-leg core, wherein the power conversion device converts AC voltage of AC terminals to DC voltage and outputting the DC voltage to DC terminals of the DC voltage source, and the power conversion device comprises:

a transformer having a primary-side winding connected to the AC terminals and a secondary-side winding which is the winding coupled body and which is connected to the DC terminals, via rectification elements as the nonlinear elements, and the DC reactor, wherein the secondary-side winding of the transformer is composed of a first winding and a second winding having respective ends connected in series to each other at an intermediate point, and other ends connected to the intermediate point via the rectification elements, the DC reactor, and the DC terminals, the DC reactor is composed of a third winding, the primary-side winding of the transformer is composed of a fourth winding and a fifth winding having respective ends connected in series to each other and other ends connected to the AC terminals, the power conversion device comprises a three-leg core in which the number n for the multi-leg core is 2 so that the three-leg core is formed of two side legs and a center leg having a gap portion, the first winding and the second winding being wound around the respective side legs, the third winding being wound around the center leg, the fourth winding and the fifth winding being wound around the respective side legs, wherein winding directions of the first winding, the second winding, and the third winding are set so that magnetic fluxes generated by DC currents flowing through the first winding, the second winding, and the third winding merge in the same direction at the center leg, and winding directions of the fourth winding and the fifth winding are set so that magnetic fluxes generated by AC currents flowing through the fourth winding and the fifth winding cancel each other at the center leg, whereby the transformer and the DC reactor are integrated using the three-leg core, wherein the power conversion device further comprises a filter capacitor in parallel with the DC terminals, wherein a leakage inductance of the transformer and the DC reactor form a filter reactor resonating with the filter capacitor.

9. The power conversion device according to claim 8, wherein a leakage inductance of the transformer is adjustable through changing of the number of turns of the third winding.

10. The power conversion device according to claim 8, wherein an inductance of the DC reactor is adjustable through changing of the numbers of turns of the first winding and the second winding.

11. The power conversion device according to claim 8, wherein a leakage inductance of the transformer is adjustable through changing of a magnetic resistance of the center leg.

12. The power conversion device according to claim 8, further comprising a switching circuit which has switching elements and which converts DC voltage of the DC voltage source to AC voltage and outputs the AC voltage to the AC terminals, wherein the DC voltage of the DC voltage source is converted and the resultant voltage is outputted to the DC terminals.

13. The power conversion device according to claim 12, wherein resonance capacitors that resonate with a leakage inductance of the transformer are connected between both poles of the switching elements, so that switching of the switching elements are performed at zero voltage.

14. The power conversion device according to claim 12, wherein current when the switching elements are turned on is reduced by a leakage inductance of the transformer, whereby switching loss of the switching circuit is reduced.

15. The power conversion device according to claim 8, wherein the third winding is composed of two divided windings wound around the center leg, one of the two divided windings being provided on a positive pole side of the DC terminals, the other one being provided on a negative pole side of the DC terminals.

* * * * *